US008612681B2

(12) United States Patent
Saito et al.

(10) Patent No.: US 8,612,681 B2
(45) Date of Patent: Dec. 17, 2013

(54) STORAGE SYSTEM, STORAGE APPARATUS AND METHOD OF CONTROLLING STORAGE SYSTEM

(75) Inventors: Hideo Saito, Kawasaki (JP); Yoshiaki Eguchi, Yokohama (JP); Akira Yamamoto, Sagamihara (JP)

(73) Assignee: Hitachi, Ltd, Tokyo (JP)

( * ) Notice: Subject to any disclaimer, the term of this patent is extended or adjusted under 35 U.S.C. 154(b) by 232 days.

(21) Appl. No.: 13/376,754

(22) PCT Filed: Nov. 22, 2011

(86) PCT No.: PCT/JP2011/006488
§ 371 (c)(1),
(2), (4) Date: Dec. 7, 2011

(87) PCT Pub. No.: WO2013/076757
PCT Pub. Date: May 30, 2013

(65) Prior Publication Data
US 2013/0132673 A1    May 23, 2013

(51) Int. Cl.
*G06F 12/00* (2006.01)
(52) U.S. Cl.
USPC .......................................... 711/114; 711/141
(58) Field of Classification Search
None
See application file for complete search history.

(56) References Cited

U.S. PATENT DOCUMENTS

| 5,694,570 | A | * | 12/1997 | Beardsley et al. ............ 711/113 |
| 2006/0031450 | A1 | | 2/2006 | Unrau et al. |
| 2007/0260717 | A1 | | 11/2007 | Kano |
| 2008/0104443 | A1 | | 5/2008 | Akutsu et al. |
| 2010/0138621 | A1 | | 6/2010 | Arifin |
| 2011/0208914 | A1 | * | 8/2011 | Winokur et al. ............... 711/119 |

FOREIGN PATENT DOCUMENTS

EP    1777875 A1    4/2007

OTHER PUBLICATIONS

Nam et al., "An Adaptive High-Low Water Mark Destage Algorithm for Cached RAID5", ©2002 IEEE, p. 1-8.*

* cited by examiner

*Primary Examiner* — Brian Peugh
(74) *Attorney, Agent, or Firm* — Volpe and Koenig, P.C.

(57) ABSTRACT

A storage system enables a core storage apparatus to execute processing requiring securing of data consistency, while providing high write performance to a host computer.

A storage system includes an edge storage apparatus 20 configured to communicate with a host computer 10 and including a cache memory 25, and a core storage apparatus 30 that communicates with the edge storage apparatus 20 and perform I/O processing on a storage device 39. When receiving a write request from the host computer 10, the edge storage apparatus 20 processes the write request by writeback. When about to execute storage function control processing, on condition that data consistency is be secured, such as pair split processing of a local copy function, the core storage apparatus 30 requests the edge storage apparatus 20 to perform forced destage of dirty data in the cache memory 25 and then executes the storage function control processing after the completion of the forced destage.

20 Claims, 15 Drawing Sheets

STORAGE SYSTEM, STORAGE APPARATUS AND METHOD OF CONTROLLING STORAGE SYSTEM

TECHNICAL FIELD

The present invention relates to a storage system, a storage apparatus, and a method of controlling a storage system.

BACKGROUND ART

PTL 1 discloses a storage system in a so-called core-edge design configured to allow a client apparatus to access data stored in a storage of an access node located in a remote place through another access node located near the client apparatus. In this storage system, an access node serving as an edge caches data generated when a client apparatus accesses an access node serving as a core, and thereby an amount of data movement between storage apparatuses in the storage system is curbed.

CITATION LIST

Patent Literature

PTL 1: US Patent Application Publication NO. 2006/0031450

SUMMARY OF INVENTION

Technical Problem

For the storage system configured as disclosed in PTL 1, there are two conceivable methods of operations performed in response to a write request sent from a client apparatus (hereinafter, the operations will be also referred to "writeback" and "writethrough").

In the writeback, after an edge storage apparatus caches write data of a write request received from a client apparatus, the edge storage apparatus immediately sends a response to the client apparatus. The data cached in the edge storage apparatus is sent to the core storage apparatus at a timing asynchronous with the write request. The writeback is expected to achieve high write performance since responses are returned to the client apparatuses immediately.

The writeback, however, does not always guarantee that a data status recognized by the client apparatus is the same as the data status actually stored in the core storage apparatus (hereinafter, "the two are the same" will be also referred to as "the two are consistent"). For instance, some kinds of processing for functions included in the core storage apparatus cannot be run since the kinds of processing are subject to an execution requirement that the data consistency must be ensured.

On the other hand, in the writethrough, when the edge storage apparatus receives a write request from a client apparatus, the edge storage apparatus sends the write data to the core storage apparatus, and returns a response to the client apparatus after receiving a response from the core storage apparatus. The writethrough, however, achieves only a lower write performance than the writeback even though the consistency of data stored in the core storage apparatus is guaranteed.

The present invention has been made in consideration of the foregoing background, and aims to provide a storage system, a storage apparatus, and a method of controlling a storage system which are expected to achieve high write performance and enable a core storage apparatus to execute processing that can be executed on the condition that the data consistency is ensured.

Solution to Problem

One of the main features of the present invention is a storage system including a first storage apparatus communicatively coupled to an external apparatus and including a cache memory, and a second storage apparatus communicatively coupled to the first storage apparatus and performs I/O processing on a storage device, wherein the first storage apparatus, when receiving a first write request that is a write request sent from the external apparatus, stores write data for the received first write request to the cache memory, returns a response to the external apparatus upon completion of the storing, and destages the write data at a timing asynchronous with the response by sending the second storage apparatus a second write request that is a write request for the write data, the second storage apparatus stores the write data into the storage device upon receipt of the second write request from the first storage apparatus, the second storage apparatus sends the first storage apparatus a forced destage request that is a request instructing the destage of the write data stored in the cache memory, before executing a predetermined storage function control processing, the first storage apparatus, when receiving the forced destage request, performs forced destage of destaging the write data from the cache memory in response to the request, and, upon completion of the forced destage, sends a notification of the completion to the second storage apparatus, and the second storage apparatus executes the storage function control processing after receiving the notification from the first storage apparatus.

Advantageous Effects of Invention

According to the present invention, the storage system is expected to achieve high write performance and enables the core storage apparatus to execute processing that can be executed on the condition that data consistency is ensured.

DESCRIPTION OF EMBODIMENTS

Figure 1:
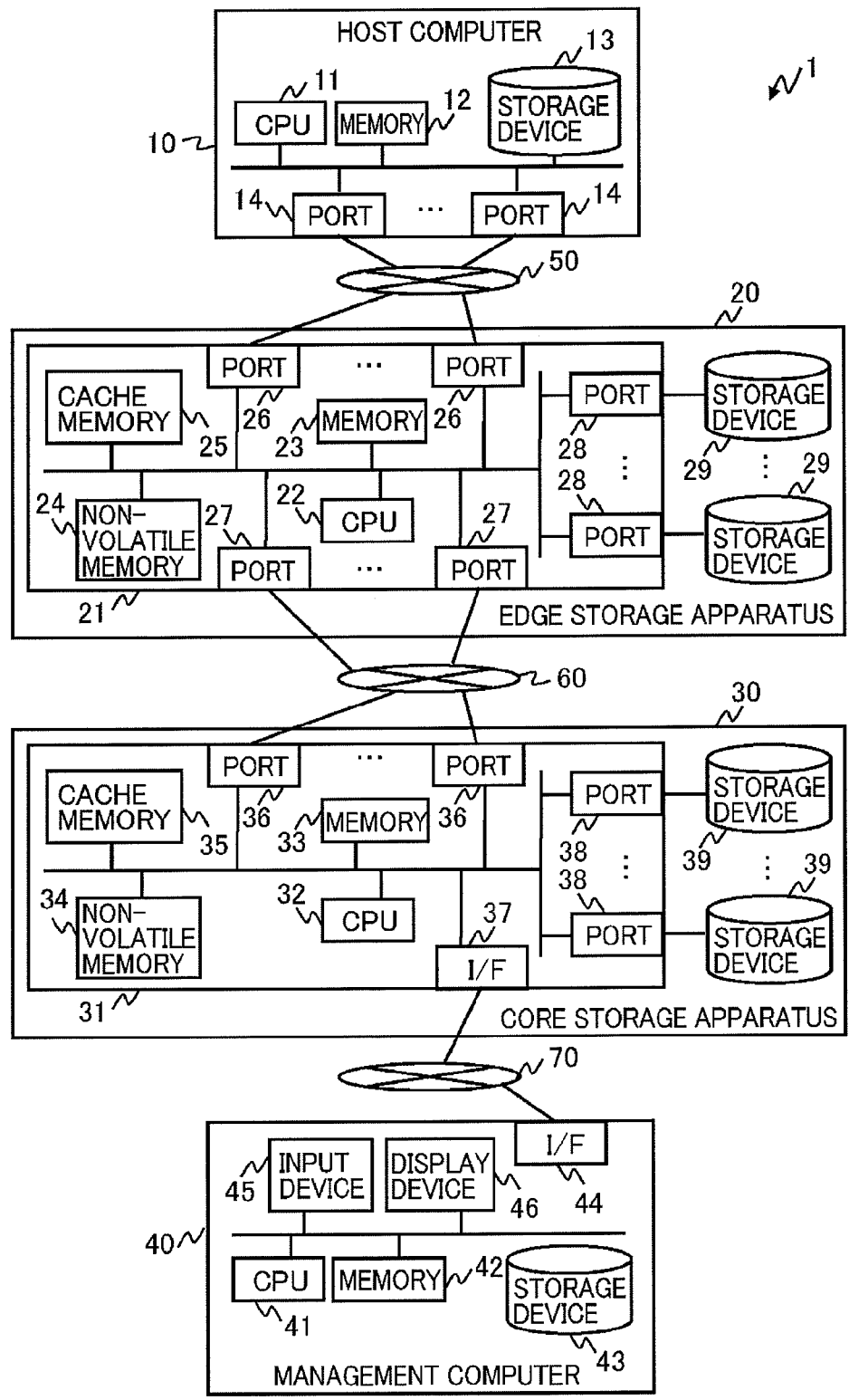
FIG. 1 is a diagram showing a schematic configuration of a storage system.

FIG. 1 shows a schematic configuration of a storage system 1 to be illustrated as an embodiment. As shown in FIG. 1, the storage system 1 includes a host computer 10 (external apparatus), an edge storage apparatus 20 (first storage apparatus), a core storage apparatus 30 (second storage apparatus), and a management computer 40.

As shown in FIG. 1, the host computer 10 and the edge storage apparatus 20 are communicatively coupled to each other through a SAN (Storage Area Network) 50. The edge storage apparatus 20 and the core storage apparatus 30 are communicatively coupled to each other through a SAN 60. The core storage apparatus 30 and the management computer 40 are communicatively coupled to each other through a LAN (Local Area Network) 70.

The host computer 10 includes a CPU 11, a memory 12, a storage device 13, and plurality of ports 14. The CPU 11 is a processor responsible for operation control of the entire host computer 10, and configured to read various programs stored in the storage device 13 to the memory 12 and execute the programs.

The memory 12 is used to store various programs read from the storage device 13 by the CPU 11 at the time of startup of the host computer 10 or on other occasions, and also is used as a work memory of the CPU 11.

The storage device 13 is configured with, for example, an HDD (Hard Disk Drive) or an SSD (Solid State Drive). The storage device 13 is used, for example, to store and retain various programs and control data. Each port 14 is an adapter coupling the host computer 10 to the SAN 50.

The edge storage apparatus 20 includes a control unit 21 configured to provide virtual logical units 102 to the host computer 10. The virtual logical unit 102, which will be described in detail later, is a logical unit created by virtualizing a logical unit provided by the core storage apparatus 30. And the edge storage apparatus 20 may include at least one storage device 29.

The control unit 21 includes a CPU 22, a memory 23, a nonvolatile memory 24, a cache memory 25, at least one host computer side port 26, at least one core storage apparatus side port 27, and at least one storage device side port 28.

Among the above, the CPU 22 is a processor responsible for operational control of the entire edge storage apparatus 20, and configured to read various programs stored in the nonvolatile memory 24 to the memory 23 and execute the programs.

The memory 23 is used to store the various programs reed from the nonvolatile memory 24 by the CPU 22 at the time of startup of the edge storage apparatus 20 or on the other occasions, and also is used as a work memory of the CPU 22.

The nonvolatile memory 24 is used to store and retain various programs and control data. The cache memory 25 is mainly used to temporarily store data sent and received between the host computer 10 and the core storage apparatus 30.

The host computer side port 26 is an adapter connecting the edge storage apparatus 20 to the SAN 50. The core storage apparatus side port 27 is an adapter connecting the edge storage apparatus 20 to the SAN 60. The storage device side port 28 is an adapter for the storage device 29.

The storage device 29 is configured with, for example, an SSD. The storage device 29 is mainly used to temporarily store data sent and received between the host computer 10 and the core storage apparatus 30. In the following where description is given that data is stored in the cache memory 25, there may be a case in which data is stored in the storage device 29 instead of the cache memory 25.

The core storage apparatus 30 includes a plurality of storage devices 39 (storage devices), and a control unit 31 configured to provide, as logical units, data stored in the storage devices 39 to the edge storage apparatus 20.

The storage devices 39 are each configured with, for example, an HDD or an SSD. The controller 31 is configured with a CPU 32, a memory 33, a nonvolatile memory 34, a cache memory 35, a plurality of edge storage apparatus side ports 36, an interface controlling unit 37, and at least one storage device side port 38.

The CPU 32 is a processor responsible for operational control of the entire core storage apparatus 30, and configured to read various programs stored in the nonvolatile memory 34 to the memory 33 and execute the programs. The memory 33 is used to store the various programs read from the nonvolatile memory 24 by the CPU 32 at the time of startup of the core storage apparatus 30 or on the other occasions, and also is used as a work memory of the CPU 32.

The nonvolatile memory 34 is used to store and retain the various programs and control data. The cache memory 35 is mainly used to temporarily store data sent and received between the edge storage apparatus 20 and the storage devices 39. Each of the edge storage apparatus side ports 36 is an adapter coupling the core storage apparatus 30 to the SAN 60. The storage device side ports 38 are adapters for the storage devices 39. The interface control unit 37 is an adapter coupling the core storage apparatus 30 to the LAN 70.

The management computer 40 is a computer configured to manage the core storage apparatus 30, and includes a CPU 41, a memory 42, a storage device 43, an interface control unit 44, an input device 45, and a display device 46.

The CPU 41 is a processor responsible for operational control of the entire management computer 40, and configured to read various programs stored in the storage device 43 to the memory 42 and execute the programs. The memory 42 is used to store various programs loaded from the storage device 43 by the CPU 41 at the time of startup of the management computer 40, and also is used as a work memory of the CPU 41.

The storage device 43 is configured with, for example, an HDD or an SSD. The storage device 43 is used to store and retain the various programs and control data. The interface controlling unit 44 is an adapter coupling the management computer 40 to the LAN 70. The input device 45 includes, for example, a keyboard and a mouse, and the display device 46 includes, for example, a liquid crystal display.

Figure 2:
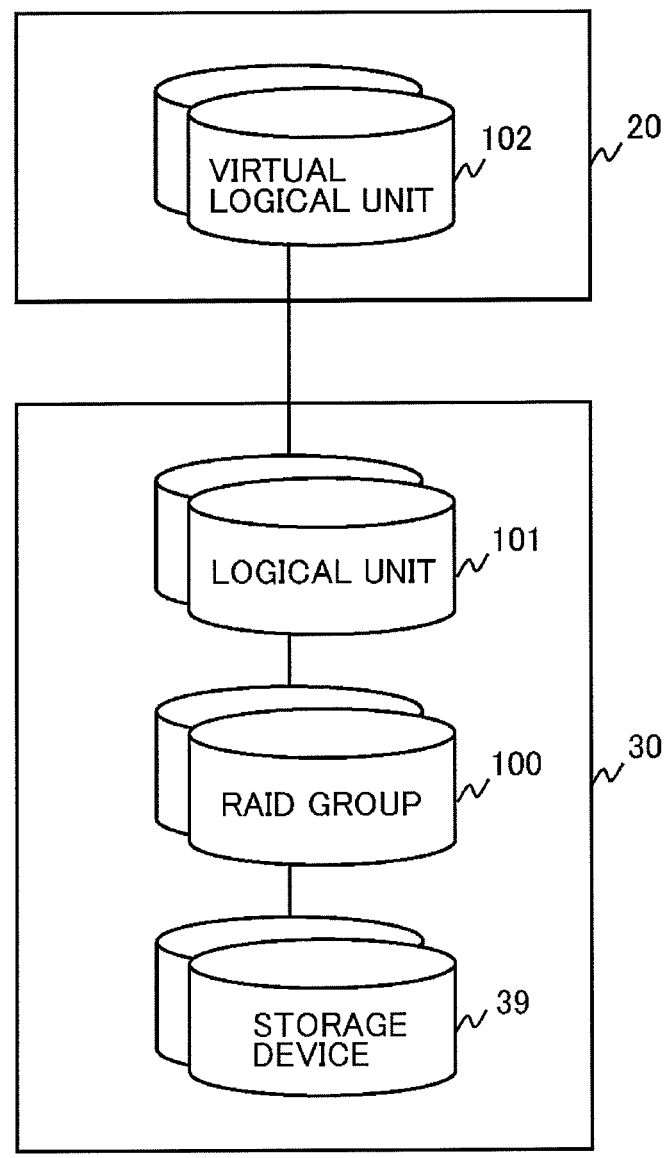
FIG. 2 is a diagram showing a tier structure of storage areas in the storage system.

FIG. 2 shows a tier structure of storage areas (physical and logical storage areas) in the storage system 1. As shown in FIG. 2, in the core storage apparatus 30, a RAID (Redundant Array of Inexpensive Disks) groups 100 are formed using storage areas of at least one of the storage devices 39. In addition, in the core storage apparatus 30, at least one logical unit 101 is set up by using a storage area provided by at least one of the RAID groups 100.

On the other hand, in the edge storage apparatus 20, at least one virtual logical unit 102 is provided by the core storage apparatus 30 set corresponding to the logical unit 101. The virtual logical unit 102 is a unit of storage area provided to the host computer 10 when a storage area of the logical unit 101 is provided by the core storage apparatus 30.

Figure 3:
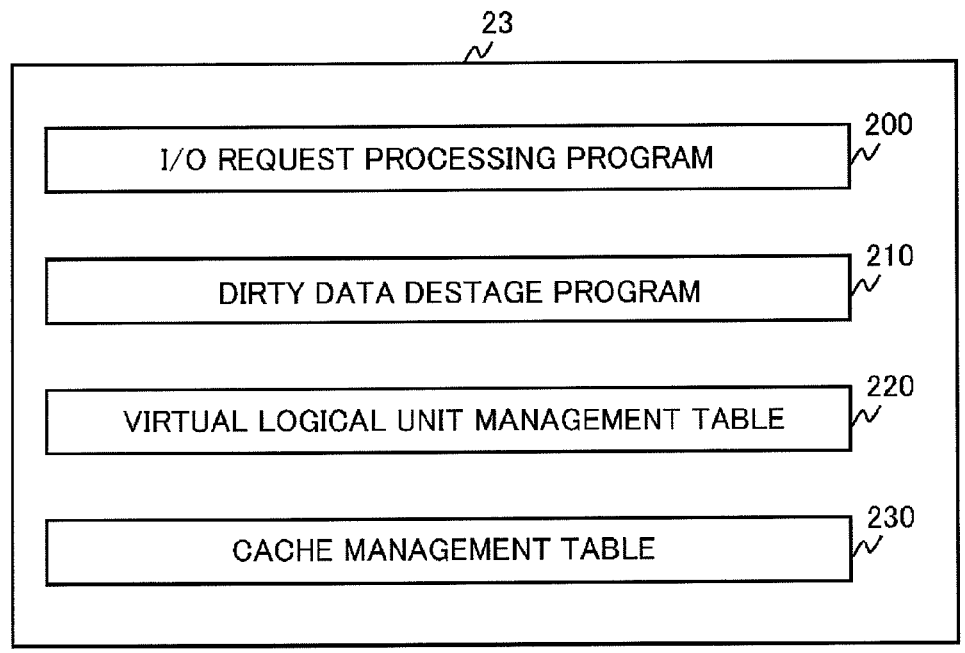
FIG. 3 is a diagram explaining main data stored in a memory in an edge storage apparatus.

FIG. 3 shows main data (programs, tables and the like) stored in the memory 23 of the edge storage apparatus 20. As shown in FIG. 3, an I/O request processing program 200, a dirty data destage program 210, a virtual logical unit management table 220, and a cache management table 230 are stored in the memory 23 of the edge storage apparatus 20.

The I/O request processing program 200 is a program for implementing functions related to processing for I/O requests received by the edge storage apparatus 20 from the host computer 10 (a request to read data (hereinafter, also referred to as a read request) and a request to write data (hereinafter, also referred to as a write request) which the edge storage apparatus 20 receives from the host computer 10). The edge storage apparatus 20 accesses the virtual logical unit management table 220 and the cache management table 230 when needed during execution of the I/O request processing program 200.

The dirty data destage program 210 is a program for implementing a function to send to the core storage apparatus 30 write data yet to be sent to the core storage apparatus 30 (such write data will be referred to as dirty data below) among data stored in the cache memory 25 of the edge storage apparatus 20. (Hereinafter, "sending the dirty data to the core storage apparatus 30" will also be referred as "destaging".) The edge storage apparatus 20 accesses the virtual logical unit management table 220 and the cache management table 230 when needed during execution of the dirty data destage program 210.

Figure 4:
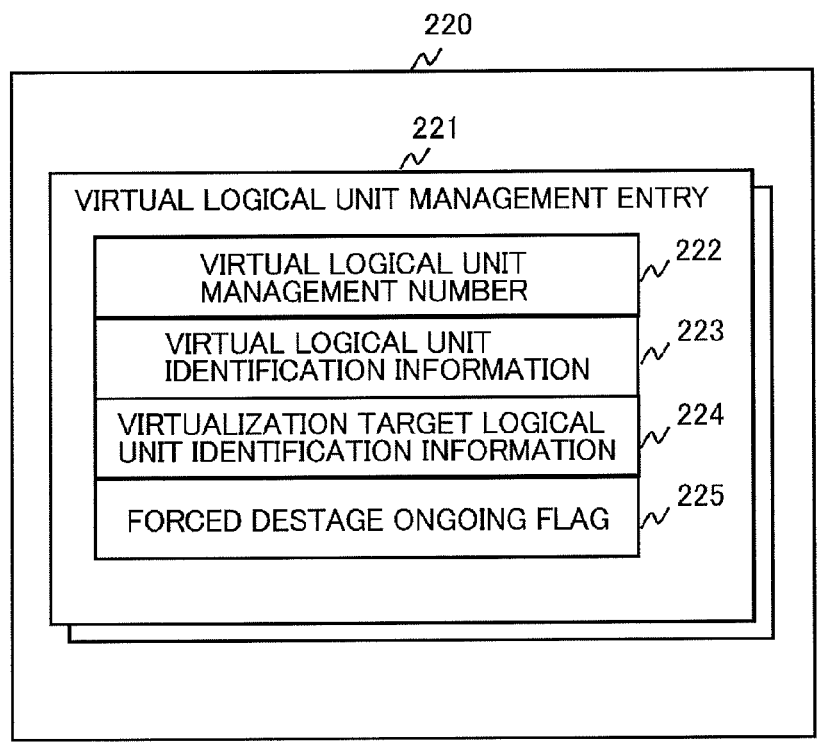
FIG. 4 is a diagram explaining a virtual logical unit management table in the edge storage apparatus.

FIG. 4 shows a data structure of the virtual logical unit management table 220. In the virtual logical unit management table 220, information on the aforementioned virtual logical unit 102 is managed. The virtual logical unit management table 220 includes at least one virtual logical unit management entry 221 each corresponding to each of the virtual logical units 102.

As shown in FIG. 4, the virtual logical unit management entry 221 includes information such as a virtual logical unit management number 222, virtual logical unit identification information 223, virtualization target logical unit identification information 224, and a forced destage ongoing flag 225.

Among the above, the virtual logical unit management number 222 is a number (identifier) for identifying the corresponding virtual logical unit 102 inside the edge storage apparatus 20.

The virtual logical unit identification information 223 is information for identifying an I/O request addressed to the corresponding virtual logical unit 102, and includes a source port address, a destination port address and a LUN (Logical Unit Number), for example.

The virtualization target logical unit identification information 224 is information for identifying a logical unit 101 in the core storage apparatus 30 for which the corresponding virtual logical unit 102 is virtualized, and includes information on a source port address, a destination port address and LUN, and the like for example.

The forced destage ongoing flag 225 is a flag for managing an operation mode set for the corresponding virtual logical unit 102, and takes a value of "ON" or "OFF". When the forced destage ongoing flag 225 is "ON", the edge storage apparatus 20 does not destage the dirty data newly stored in the cache memory 25 until the forced destage ongoing flag 225 is changed to "OFF". On the other hand, when the forced destage ongoing flag 225 is "OFF", the edge storage apparatus 20 destages the dirty data stored in the cache memory 25 without considering the timing when the dirty data was stored in the cache memory 25.

Figure 5:
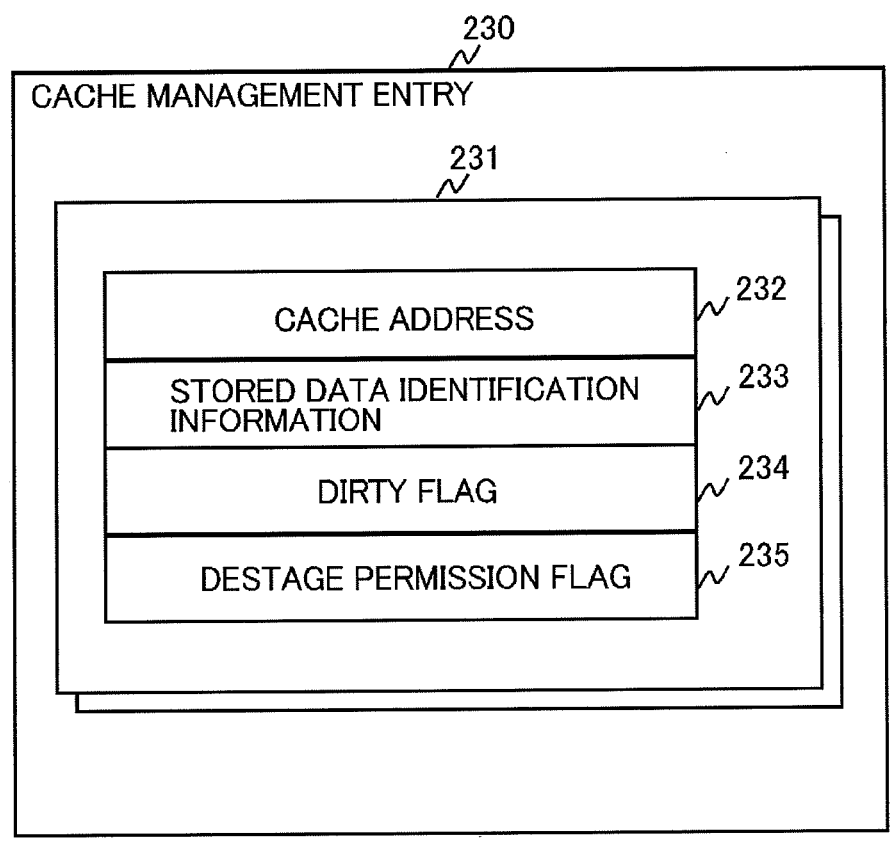
FIG. 5 is a diagram explaining a cache management table in the edge storage apparatus.

FIG. 5 shows a data structure of the cache management table 230 in the edge storage apparatus 20. In the cache management table 230, information on data temporarily stored in the cache memory 25 is managed. The cache management table 230 includes at least one cache management entry 231 each corresponding to respective data stored in the cache memory 25.

As shown in FIG. 5, the cache management entry 231 includes information such as a cache address 232, a stored data identification information 233, a dirty flag 234, and a destage permission flag 235.

Among the above, the cache address 232 is a head address of a storage area where the corresponding data is stored in the cache memory 25.

The stored data identification information 233 is identification information of the corresponding data, and includes, for example, a number (identifier) for identifying the virtual logical unit 102 where the corresponding data is stored, and information for identifying the storage area where the corresponding data is stored in the virtual logical unit 102.

The dirty flag 234 is information (flag) for managing the state of the corresponding data, and takes a value of "ON" or "OFF". The dirty flag 234 set to "ON" indicates that the corresponding data has been updated in response to a write request from the host computer 10 but the edge storage apparatus 20 has not yet sent (reflected) the updated content to the core storage apparatus 30, and thus the latest version of the corresponding data is not stored in the storage device 39 in the core storage apparatus 30. On the other hand, the dirty flag 234 set to "OFF" indicates that the latest version of the corresponding data is stored in the storage device 39 of the core storage apparatus 30.

The destage permission flag 235 is information (flag) for managing a status of the corresponding data, and takes a value of "ON" or "OFF". When the destage permission flag 235 is "ON", the edge storage apparatus 20 is permitted to destage the corresponding data to the core storage apparatus 30. On the other hand, when the destage permission flag 235 is "OFF", the edge storage apparatus 20 is prohibited from destaging (not permitted to destage) the corresponding data to the core storage apparatus 30.

Figure 6:
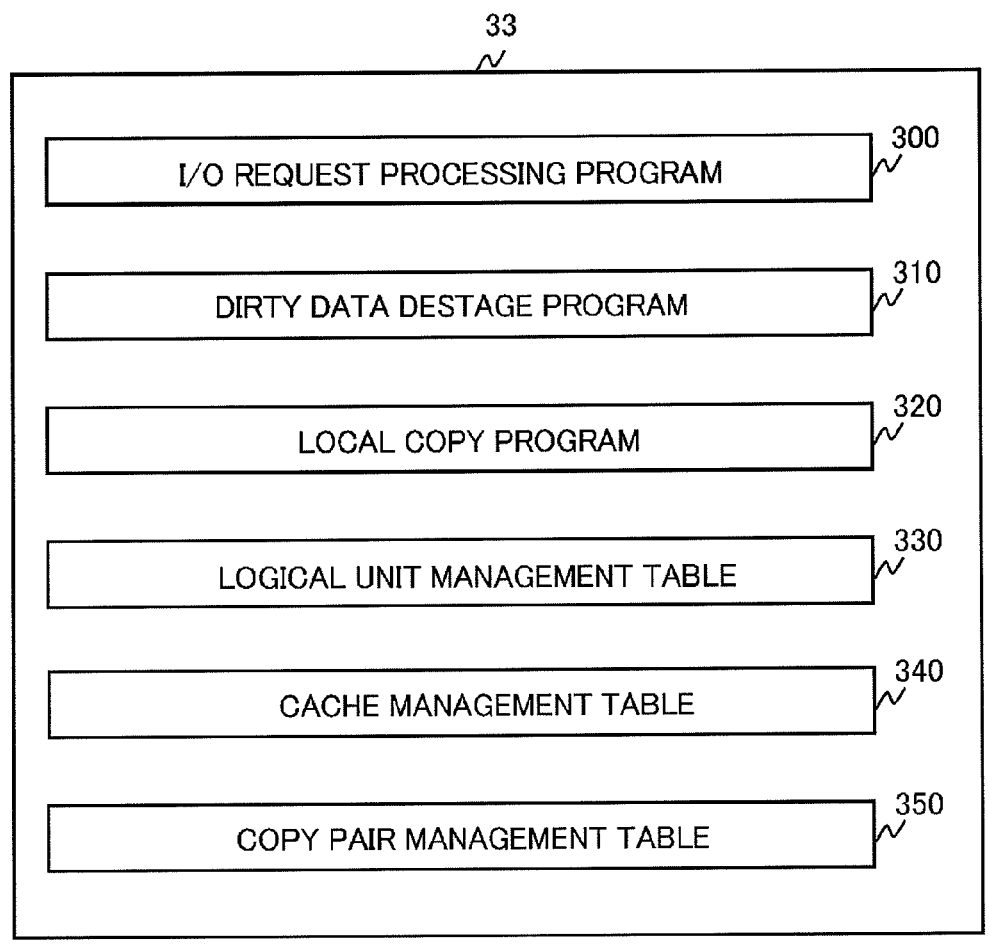
FIG. 6 is a diagram explaining main data stored in a memory in a core storage apparatus.

FIG. 6 shows main data (programs, tables and the like) stored in the memory 33 of the core storage apparatus 30. As shown in FIG. 6, an I/O request processing program 300, a dirty data destage program 310, a local copy program 320, a logical unit management table 330, a cache management table 340, and a copy pair management table 350 are stored in the memory 33 of the core storage apparatus 30.

The I/O request processing program 300 is a program for implementing functions related to processing (I/O processing) for input/output requests (I/O requests) received by the core storage apparatus 30 from the edge storage apparatus 20. (Here, the I/O requests include a read request, write request and the like received by the core storage apparatus 30 from the edge storage apparatus 20.) The core storage apparatus 30 accesses the logical unit management table 330, the cache management table 340, and the copy pair management table 350 when needed during execution of the I/O request processing program 300.

The dirty data destage program 310 is a program for implementing a function to store (destage) dirty data temporarily stored in the cache memory 35 of the core storage apparatus 30 and has not been destaged to the storage device 39 yet, into the storage device 39. The core storage apparatus 30 accesses the logical unit management table 330 and the cache management table 340 when needed during execution of the dirty data destage program 310.

The local copy program 320 is a program for implementing the following function (also called a local copy function below) in the core storage apparatus 30. When a copy source logical unit 101 (hereinafter referred to as a primary volume) and a copy destination logical unit 101 (hereinafter referred to as a secondary volume) are designated, the entire area of the primary volume is copied to the secondary volume, and when a write request is sent for the primary volume, the write data is copied to the secondary volume. The core storage apparatus 30 accesses the logical unit management table 330, the cache management table 340 and the copy pair management table 350 when needed during execution of the local copy program 320.

The local copy program 320 implements a function to suspend the copy processing upon receipt of a request, sent from the management computer 40 or the like, to suspend replicating data from the primary volume to the secondary volume (hereinafter, also referred to as "pair splitting").

Here, the above pair splitting is performed on the precondition that the state of the primary volume (data stored in the primary volume) recognized by the host computer 10 side is consistent with the actual state of the primary volume (hereinafter, this state is also referred to as a "consistent state"). This is because when the pair splitting is performed in an inconsistent state, for example, the state of the secondary volume (data stored in the secondary volume), recognized by the host computer 10 side is inconsistent with the actual state of the secondary volume, which in turn leads to unfavorable situations in user services provided by the storage system 1 and in operation of the storage system 1.

The inconsistent state includes, for example, a case where the actual state of the primary volume is older than the state of the primary volume recognized by the host computer 10 side, and a case where the order of data update on the primary volume recognized by the host computer 10 side is inconsistent with the order of data update actually performed on the primary volume (for example, the edge storage apparatus 20 side updates a first area and a second area, in this order, of the primary volume, and then returns update completion notifications of the two areas to the host computer 10, and thereafter the core storage apparatus 30 side firstly updates the second area of the primary volume).

Figure 7:
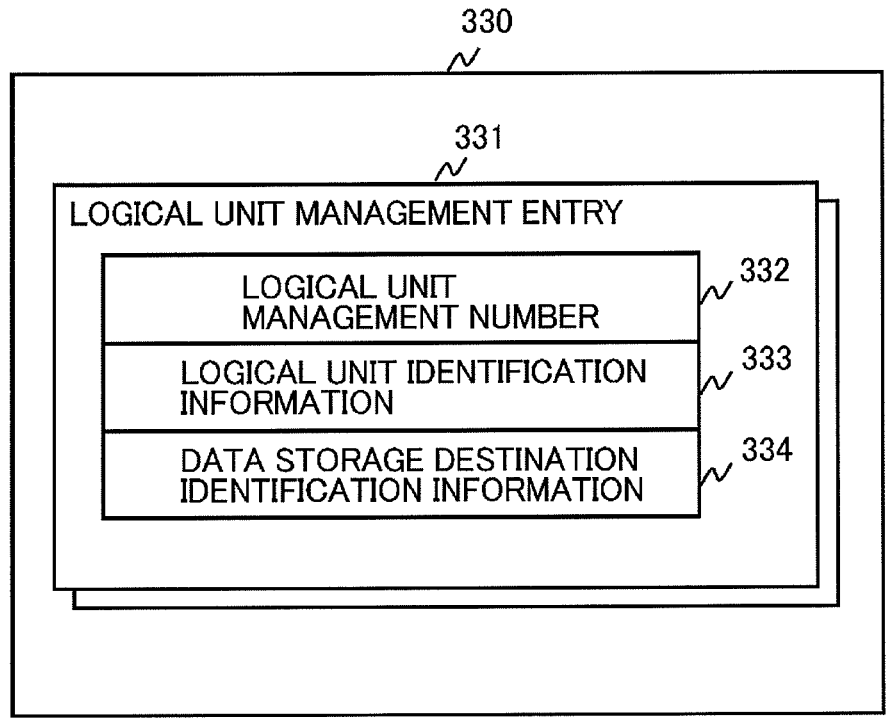
FIG. 7 is a diagram explaining a logical unit management table in the core storage apparatus.

FIG. 7 shows a data structure of the logical unit management table 330 in the core storage apparatus 30. In the logical unit management table 330, information relating to the logical unit 101 of the core storage apparatus 30 is managed. The logical unit management table 330 includes at least one logical unit management entry 331 each corresponding to a respective logical unit 101 of the core storage apparatus 30.

The logical unit management entry 331 includes information such as a logical unit management number 332, logical unit identification information 333, and data storage destination identification information 334.

Among the above, the logical unit management number 332 is a number (identifier) for identifying the corresponding logical unit 101 in the core storage apparatus 30.

The logical unit identification information 333 is information for identifying an I/O request addressed to the corresponding logical unit 101, and includes, for example, information such as a source port address, a destination port address, and a LUN.

The data storage destination identification information 334 is information for specifying a storage area of the storage device 39 where data of the corresponding logical unit 101 is stored. The data storage destination identification information 334 includes, for example, information for identifying a RAID group 100 where the data is stored, and information for identifying a storage area where the data is stored in the RAID group 100.

Figure 8:
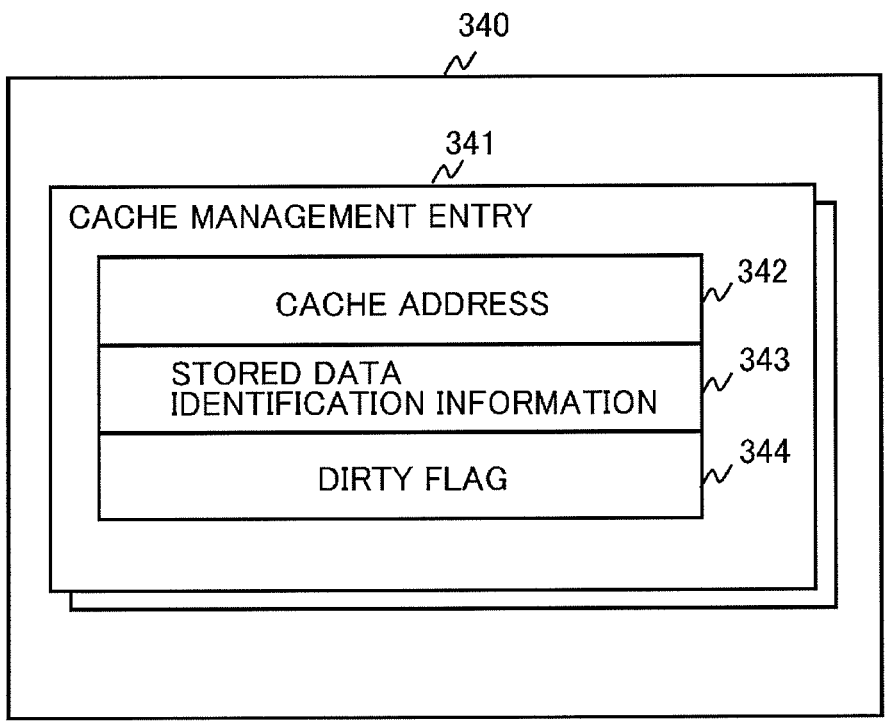
FIG. 8 is a diagram explaining a cache management table in the core storage apparatus.

FIG. 8 shows a data structure of the cache management table 340 in the core storage apparatus 30. In the cache management table 340, information relating to data temporarily stored in the cache memory 35 is managed. The cache management table 340 includes at least one cache management entry 341 each corresponding to a respective data stored in the cache memory 35.

As shown in FIG. 8, the cache management entry 341 includes information such as a cache address 342, a stored data identification information 343, and a dirty flag 344.

Among the above, the cache address 342 is a head address of a storage area where the corresponding data is stored in the cache memory 35.

The stored data identification information 343 is identification information of the corresponding data, and includes, for example, a number (identifier) for identifying a logical unit 101 where the corresponding data is stored, and information for identifying a storage area where the corresponding data is stored in the logical unit 101.

The dirty flag 344 is information (flag) for managing a status of the corresponding data, and takes a value of "ON" or "OFF". The dirty flag 344 set to "ON" indicates that the corresponding data has been updated in response to a write request from the edge storage apparatus 20 but the core storage apparatus 30 has not yet stored (reflected) the updated content to the storage device 39; and thus the latest version of the corresponding data is not stored in the storage device 39. On the other hand, the dirty flag 334 set to "OFF" indicates that the latest version of the corresponding data is stored in the storage device 39.

Figure 9:
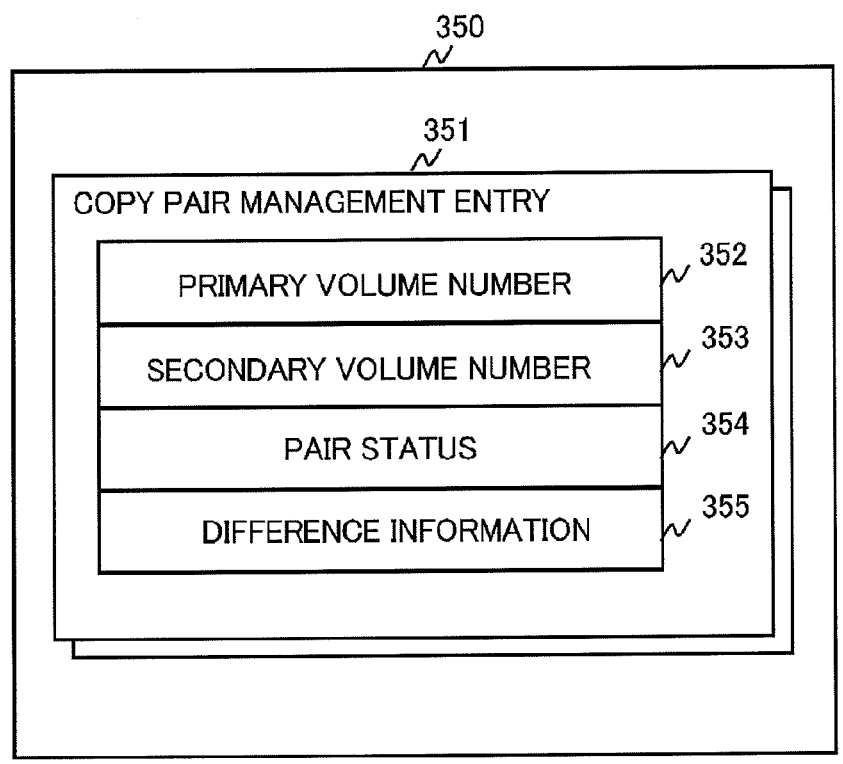
FIG. 9 is a diagram explaining a copy pair management table in the core storage apparatus.

FIG. 9 shows a data structure of the copy pair management table 350 in the core storage apparatus 30. The copy pair management table 350 is a table used for the core storage apparatus 30 to manage a correspondence between a primary volume and a secondary volume (hereinafter, a set of a primary volume and a secondary volume corresponding to each other will be referred to as a copy pair). The copy pair management table 350 includes at least one copy pair management entry 351 each corresponding to respective copy pairs.

As shown in FIG. 9, the copy pair management entry 351 includes information such as a primary volume number 352, a secondary volume number 353, a pair status 354, and difference information 355.

Among the above, the primary volume number 352 is a number for identifying a primary volume, and the secondary volume number 353 is a number for identifying a secondary volume.

The pair status 354 takes a value of "PAIR" or "PSUS" that is information indicating a control status of a copy pair.

The difference information 355 is information for managing storage areas having a data difference between a primary volume and a secondary volume, and is implemented as a bitmap including a set of bits indicating whether or not each unit storage area (for example, a data block) or the like has a difference.

Here, the pair status 354 set to "PAIR" indicates a status of the core storage 30 in which a replication is performed by the local copy function between the copy pairs (hereinafter, referred to as a PAIR status (first control status)). When the pair status 354 is "PAIR", a write request to the secondary volume from the host computer 10 or the like is prohibited. If a write request is sent to the primary volume when the pair status 354 is set to "PAIR", the core storage apparatus 30 performs as the local copy function, a replication of write data being write target data of the write request, to the secondary volume.

Note that this replication may be performed either in a synchronous or asynchronous manner with a response to the write request to the host computer 10. When the replication is performed in an asynchronous manner with the write request, the core storage apparatus 30 does not perform replication from the primary volume to the secondary volume at the time of responding to the host computer 10 in response to the write request, but manages in the difference information 355 that there is a difference between the primary volume and the secondary volume in terms of storage area corresponding to the write request. Then, the core storage apparatus 30 copies data from the primary volume to the secondary volume at an asynchronous timing independent of the write request in order to resolve the difference.

On the other hand, the pair status 354 set to "PSUS" indicates a status in which the core storage apparatus 30 is currently suspending replication of data by the local copy function between the copy pairs, and is in a state managing the data difference between the primary volume and the secondary volume (hereinafter, also referred to as a PSUS status (second control status)). When the pair status 354 is "PSUS", a write request to the secondary volume from the host computer 10 or the like can be permitted.

When a write request to a primary volume or the secondary volume is sent, the core storage apparatus 30 manages in the difference information 355 that there is a difference between the primary volume and the secondary volume in terms of storage area of the primary volume or the secondary volume corresponding to the write request.

When changing the pair status 354 from "PSUS" to "PAIR" in response to an instruction from the management computer 40 or the like, the core storage apparatus 30 copies data in the primary volume to the secondary volume on the basis of the difference information 355 in order to resolve the difference managed in the difference information 355.

Figure 10:
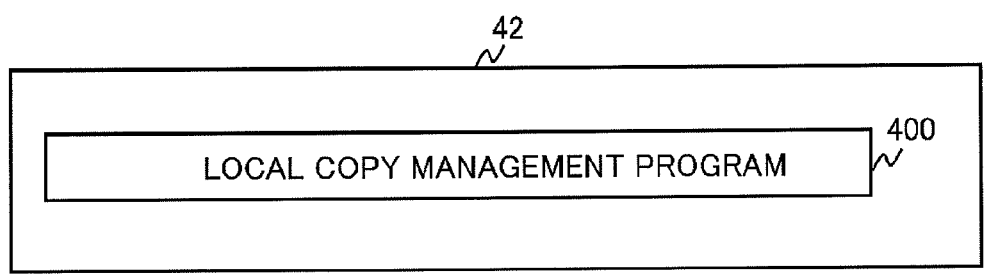
FIG. 10 is a diagram explaining main data stored in a memory in a management computer.

FIG. 10 shows main data (program) stored in the memory 42 of the management computer 40. As shown in FIG. 10, a local copy management program 400 is stored in the memory 42 of the management computer 40.

The local copy management program 400 is a program for implementing functions related to the control and management of the local copy function. For example, the local copy management program 400 sends the aforementioned pair splitting instruction to the core storage apparatus 30 at a time of pair splitting. Also the local copy management program 400 implements a function to send such as an instruction to, for example, restore the control status of a copy pair to the PAIR status (change from the PSUS status to the PAIR status) to the core storage apparatus 30.

=Description of Processing=

Hereinafter, processing performed in the storage system 1 will be described. In the following description, "SP" attached in front of reference numerals indicates processing step.

Figure 11:
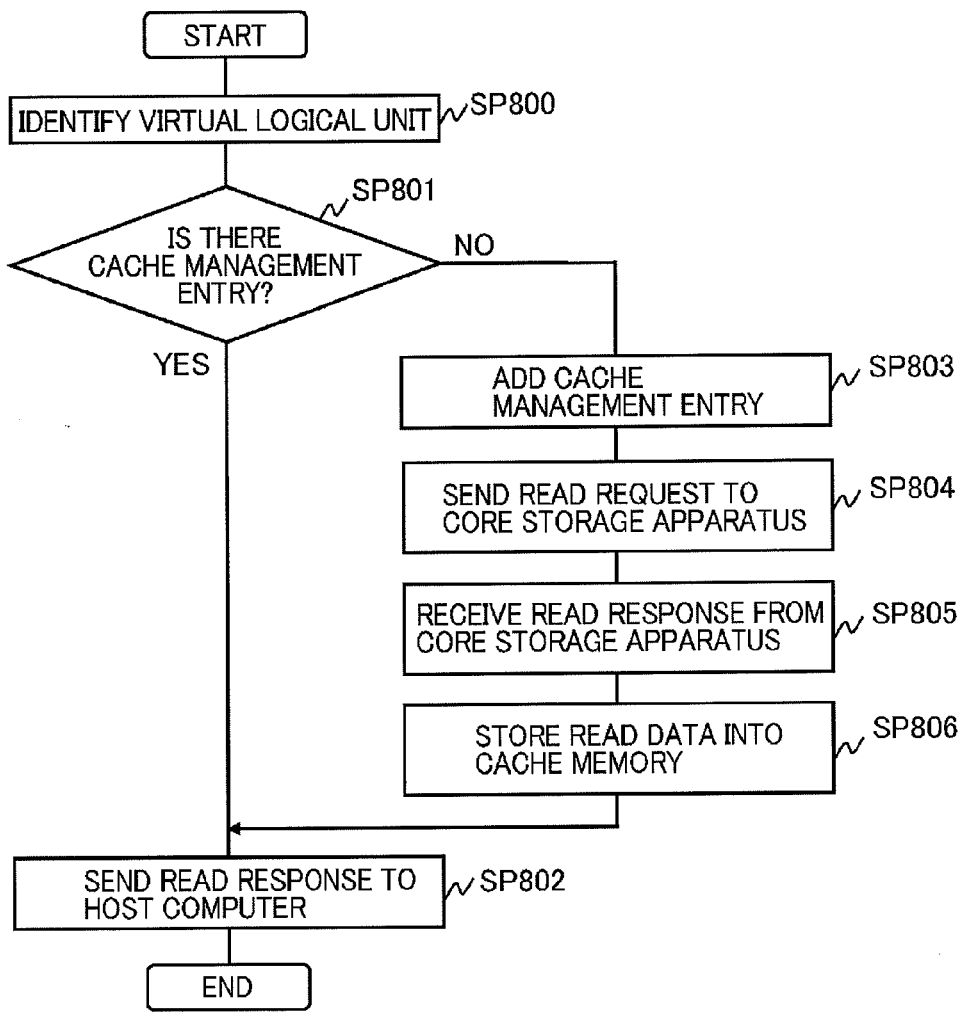
FIG. 11 is a flowchart explaining read processing (edge storage apparatus).

FIG. 11 is a flowchart explaining processing (hereinafter, also referred to as read processing (edge storage apparatus)) that the edge storage apparatus 20 performs when receiving a read request from the host computer 10 (hereinafter, also referred to as a read request (edge storage apparatus)). The read processing (edge storage apparatus) is carried out by the CPU 22 of the edge storage apparatus 20 executing the I/O request processing program 200.

Upon receipt of a read request (edge storage apparatus) from the host computer 10, the edge storage apparatus 20 firstly identifies the virtual logical unit 102 of a read destination of the read request (edge storage apparatus) (SP800).

Specifically, the edge storage apparatus 20 extracts information for identifying the virtual logical unit 102 from the read request (edge storage apparatus), as well as refers to the virtual logical unit management table 220 to identify the virtual logical unit management entry 221 having registered therein the virtual logical unit identification information 223 corresponding to the information for identifying the virtual logical unit 102 extracted from the read request (edge storage apparatus). Here, the information for identifying the virtual logical unit 102 includes, for example, the source port address, the destination port address, and the LUN (Logical Unit Number).

Next, with reference to the cache management table 230, the edge storage apparatus 20 determines whether or not there is a cache management entry 231 corresponding to read data that is the read target data of the read request (edge storage apparatus) (SP801).

To be more specific, the edge storage apparatus 20 extracts information for identifying the read data from the read request (edge storage apparatus), as well as refers to the cache management table 230 to determine whether or not there is a cache management entry 231 having registered therein the stored data identification information 233 corresponding to both the virtual logical unit management number 222 registered in the virtual logical unit management entry 221 identified in step SP800, and the information for identifying the read data extracted from the read request (edge storage apparatus). Here, the information for indentifying the read data is, for example, an LBA (Logical Block Address).

In this determination, obtaining a positive result indicating that there is a cache management entry 231 corresponding to the read data (SP801: YES) means that the read data is stored in the cache memory 25. In this case, the edge storage apparatus 20 performs the processing in step SP802.

On the other hand, in the determination of SP801, obtaining a negative result indicating that there is no cache management entry 231 corresponding to the read data (SP801: NO) means that the read data is not stored in the cache memory 25. In this case, the edge storage apparatus 20 performs the processing in step SP803 and the steps that follow.

In step SP803, the edge storage apparatus 20 adds the cache management entry 231 corresponding to the read data to the cache management table 230 (SP803). At this time, the edge storage apparatus 20 registers the address of a free area in the cache memory 25 to the cache address 232 of the cache management entry 231 to be added. In addition, the edge storage apparatus 20 registers the information for identifying the read data extracted from the read request (edge storage apparatus), to the stored data identification information 233 of the added cache management entry 231 to be added. Moreover, the edge storage apparatus 20 registers "OFF" in the dirty flag 234 of the added cache management entry 231 to be added.

Then, the edge storage apparatus 20 identifies the logical unit 101 in the core storage apparatus 30 that the virtual logical unit 102 of the read destination virtualizes, on the basis of the virtualization target logical unit identification information 224 registered in the virtual logical unit management entry 221 identified in step SP800, and sends the core storage apparatus 30 a read request to read data with the identified location unit 101 (hereinafter also referred to as a read request (core storage apparatus)) as the target (SP804).

Thereafter, the edge storage apparatus 20 receives a response (read data) to the read request (core storage apparatus) from the core storage apparatus 30 (SP805), and then stores the received read data into the cache memory 25 (SP806). After that, the edge storage apparatus 20 performs the processing in step SP802.

In step SP802, the edge storage apparatus 20 reads the read data from the cache memory 25, and sends the read data thus read to the host computer 10 (SP802).

As described above, in the case where the edge storage apparatus 20 receives a read request from the host computer 10, the read data is returned to the host computer 10 via the cache memory 25 of the edge storage apparatus 20.

Figure 12:
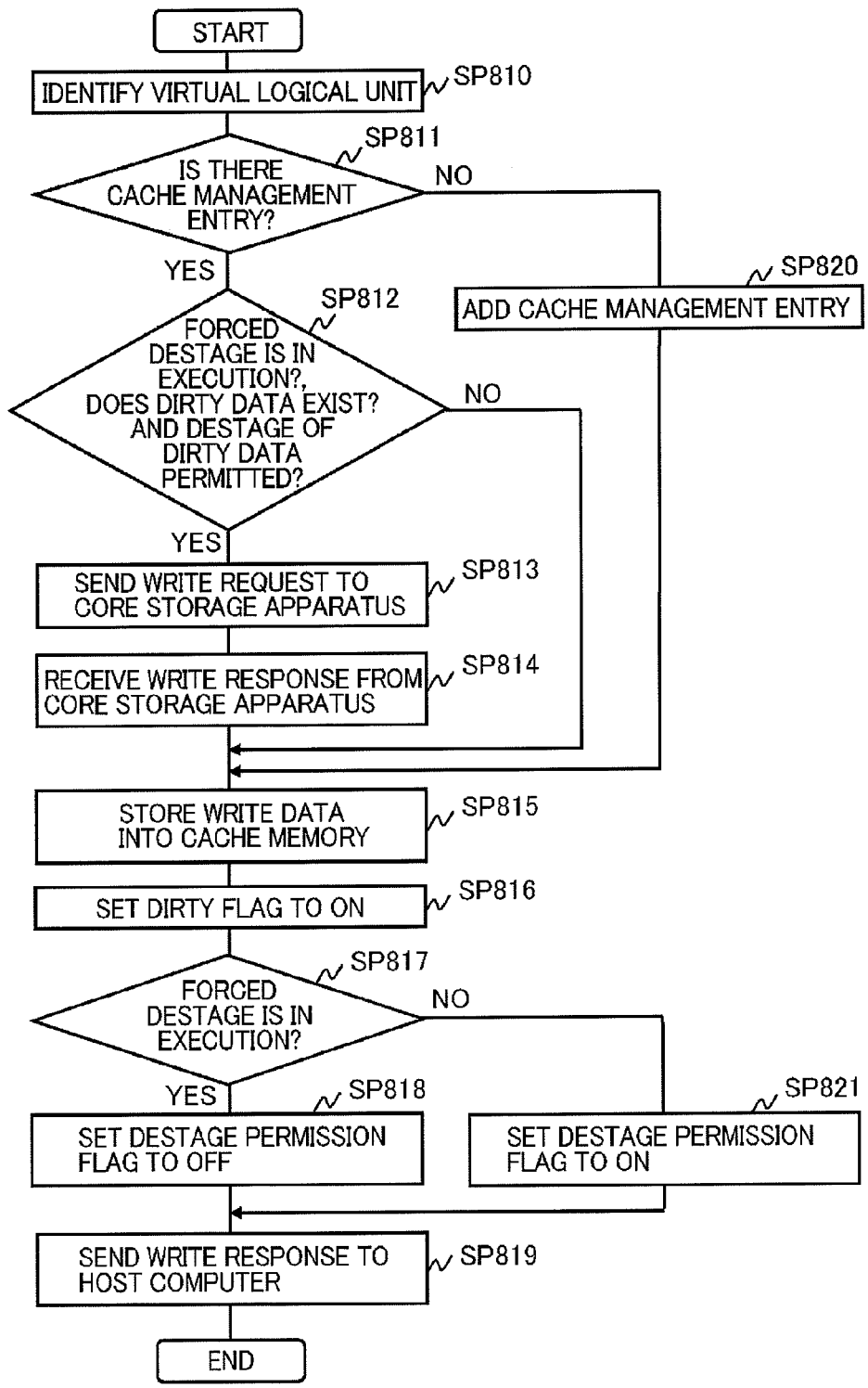
FIG. 12 is a flowchart explaining write processing (edge storage apparatus).

FIG. 12 is a flowchart explaining processing (hereinafter, also referred to as write processing (edge storage apparatus)) that the edge storage apparatus 20 performs when receiving a write request from the host computer 10 (hereinafter, also referred to as a write request (edge storage apparatus) (first write request)). The write processing (edge storage apparatus) is carried out by the CPU 22 of the edge storage apparatus 20 executing the I/O request processing program 200.

Upon receipt of a write request (edge storage apparatus) from the host computer 10, the edge storage apparatus 20 firstly identifies the virtual logical unit 102 of a write destination of the write request (edge storage apparatus) (SP810).

Specifically, the edge storage apparatus 20 extracts information for identifying the virtual logical unit 102 from the write request (edge storage apparatus), as well as refers to the virtual logical unit management table 220 to identify the virtual logical unit management entry 221 having registered therein the virtual logical unit identification information 223 corresponding to the information for identifying the virtual logical unit 102 extracted from the write request (edge storage apparatus). Here, the information for identifying the virtual logical unit 102 includes, for example, the source port address, the destination port address, and the LUN.

Next, with reference to the cache management table 230, the edge storage apparatus 20 determines whether or not there is a cache management entry 231 corresponding to write data that is write target data of the write request (edge storage apparatus) (SP811).

To be more specific, the edge storage apparatus 20 extracts information for identifying the write data from the write request (edge storage apparatus), as well as refers to the cache management table 230 to determine whether or not there is a cache management entry 231 having registered therein the stored data identification information 233 corresponding to both the virtual logical unit management number 222 registered in the virtual logical unit management entry 221 identified in step SP810, and the information for identifying the write data extracted from the write request (edge storage apparatus). Here, the information for indentifying the write data is, for example, the LBA.

When obtaining a positive result indicating that there is a cache management entry 231 corresponding to the write data in this determination (SP811: YES), the edge storage apparatus 20 performs processing in step SP812 and the steps that follow.

On the other hand, when obtaining a negative result indicating that there is no cache management entry 231 corresponding to the write data in the determination of step SP811 (SP811: NO), the edge storage apparatus 20 adds the cache management entry 231 corresponding to the write data to the cache management table 230 (SP820). Then, the edge storage apparatus 20 performs processing in step SP815 and the steps that follow.

Here, when adding the cache management entry 231 in step SP820, the edge storage apparatus 20 registers the address of a free area in the cache memory 25 as the cache address 232 and registers, as the stored data identification information 233, the information for identifying the write data extracted from the write request (edge storage apparatus).

In step SP812, with reference to the virtual logical unit management table 200 and the cache management table 230, the edge storage apparatus 20 determines whether or not the virtual logical unit 102 of the write destination is currently in execution of the forced destage to be described later, whether or not dirty data corresponding to the write data exists in the cache memory 25, and whether or not the destage of the dirty data is currently permitted.

Specifically, the edge storage apparatus 20 determines whether or not the forced destage ongoing flag 225 registered in the virtual logical unit management entry 221 identified in step SP810 is "ON", whether or not the dirty flag 234 registered in the cache management entry 231 corresponding to the write data is "ON", and whether or not the destage permission flag 235 registered in the cache management entry 231 corresponding to the write data is "ON".

When obtaining, in this determination, positive results indicating that the virtual logical unit 102 of the write destination is currently in execution of the forced destage to be described later, that the dirty data corresponding to the write data exists in the cache memory 25, and that the destage of the dirty data is permitted (SP812: YES), the edge storage apparatus 20 performs processing in step SP813 and the steps that follow.

On the other hand, when obtaining, in the determination in step SP812, any one of negative results indicating that the virtual logical unit 102 of the write destination is not currently in execution of the forced destage to be described later, that the dirty data corresponding to the write data does not exist in the cache memory 25, and that the destage of the dirty data corresponding to the write data in the cache memory 25 is not permitted (SP812: NO), the edge storage apparatus 20 performs processing in step SP815 and the steps that follow.

In step SP813, the edge storage apparatus 20 identifies the logical unit 101 of the core storage apparatus 30 corresponding to the virtual logical unit 102 of the write destination of the write request (edge storage apparatus) on the basis of the virtualization target logical unit identification information 224 registered in the virtual logical unit management entry 221 identified in step SP810, and sends the core storage apparatus 30 a write request (hereinafter also referred to as a write request (core storage apparatus)) to write the dirty data stored in the cache memory 25 with the identified logical unit 101 as the target (SP813).

The edge storage apparatus 20 receives a response to the write request (core storage apparatus) from the core storage apparatus 30 (SP814), and then performs processing in step SP815 and the steps that follow.

As described above, in the case where the virtual logical unit 102 of the write destination is currently in execution of the forced destage to be described later, where the dirty data corresponding to the write data exists in the cache memory 25, and where the destage of the dirty data is currently permitted, the edge storage apparatus 20 destages the dirty data corresponding to the write data from the cache memory 25 before updating the dirty data with the write data. For this reason, the primary volume can be fixed at any time section scheduled by the storage function control processing.

In step SP815, the edge storage apparatus 20 stores the write data received from the host computer 10 into the cache memory 25, and registers "ON" in the dirty flag 234 of the cache management entry 231 corresponding to the write data (SP816). Note that the dirty data having "ON" registered in the dirty flag 234 is destaged to the core storage apparatus 30 at an asynchronous timing independent of the write request (edge storage apparatus).

In step SP817, the edge storage apparatus 20 determines whether or not the dirty data of the virtual logical unit 102 corresponding to the write data is currently in execution of the forced destage. When obtaining a positive result indicating that the dirty data of the virtual logical unit 102 corresponding to the write data is currently in execution of the forced destage in this determination (SP817: YES), the edge storage apparatus 20 registers "OFF" (destage not permitted) in the destage permission flag 235 of the cache management entry 231 corresponding to the write data (SP818). Then, the edge storage apparatus 20 performs processing in step SP819.

On the other hand, when obtaining a negative result indicating that the dirty data of the virtual logical unit 102 of the write destination is not currently in execution of the forced destage in the determination in step SP817 (SP817: NO), the edge storage apparatus 20 registers "ON" (permit destage) in the destage permission flag 235 of the cache management entry 231 corresponding to the write data (SP821). Then, the edge storage apparatus 20 performs processing in step SP819.

As described above, in the case where the dirty data of the virtual logical unit 102 being the storage destination of the write data is currently in execution of the forced destage (SP817: YES), the destage permission flag 235 in the cache management entry 231 corresponding to the write data is set to "OFF" (destage not permitted) (SP818). Thus, the write data stored in the cache memory 25 is excluded from target for the destage (SP813 and SP814, and SP832 and SP833 in FIG. 13 to be described later), and remains as the dirty data in the cache memory 25. In this way, the write data of a write request issued during the forced destage can be held in the cache memory 25.

In the following step SP819, the edge storage apparatus 20 sends the host computer 10 a notification notifying completion of the write processing (hereinafter also referred to as a write response) (SP819).

As described above, if the virtual logical unit 102 of the write destination of the write request is not currently in execution of the forced destage to be described later (SP812: NO), the edge storage apparatus 20 returns the write response to the host computer 10 without performing the destage (SP813 and SP814) (SP819). For this reason, the response can be quickly returned to the host computer 10 and high write performance can be provided to the host computer 10.

On the other hand, if the virtual logical unit 102 of the write destination of the write request is currently in execution of the forced destage to be described later (SP812: YES), the edge storage apparatus 20 performs the destage (SP813 and SP814) and thereby secures the consistency of data stored in the storage device 39, which enables execution of storage function control processing (pair splitting processing to be described later) that is processing for a storage function that can be executed on condition that the data consistency is secured.

As described above, the storage system 1 of the present embodiment is capable of providing high write performance to the host computer 10 and also enables the core storage apparatus 30 to execute the storage function control processing on the condition that the data consistency is secured.

Figure 13:
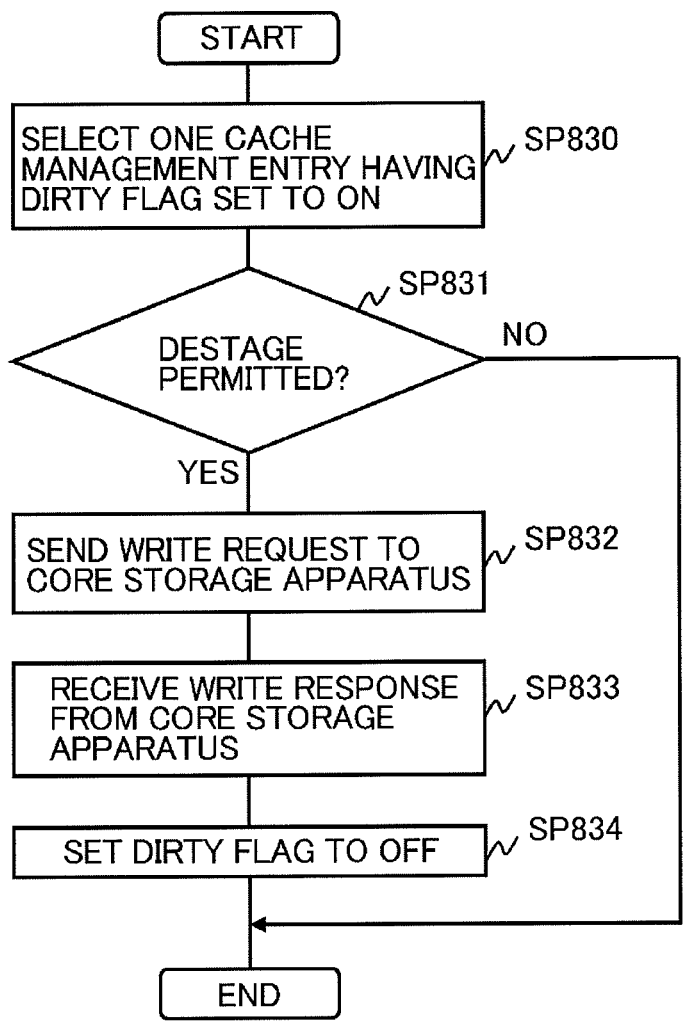
FIG. 13 is a flowchart explaining normal destage processing.

FIG. 13 is a flowchart explaining processing performed by the edge storage apparatus 20 (hereinafter also referred to as normal destage processing). This processing is performed at a designated timing or at a specified cycle, or such as when there is shortage of free area in the cache memory 25 reaching a predetermined threshold. The normal destage processing is implemented by the CPU 22 of the edge storage apparatus 20 executing the dirty data destage program 210. Hereinafter, the normal destage processing will be described with reference to FIG. 13.

The edge storage apparatus 20 firstly selects one cache management entry 231 having "ON" registered in the dirty flag 234 with reference to the cache management table 230 (SP830).

Then, the edge storage apparatus 20 determines whether or not "ON" is registered in the destage permission flag 235 of the cache management entry 231 selected in step SP830 (SP831).

When obtaining a positive result indicating that "ON" is registered in the destage permission flag 235 of the cache management entry 231 selected in step SP830 in this determination (SP831: YES), the edge storage apparatus 20 performs processing in step SP832 and the steps that follow.

On the other hand, when obtaining a negative result indicating that "ON" is not registered in the destage permission flag 235 of the cache management entry 231 selected in step SP830 in the determination in step SP831 (SP831: NO), the edge storage apparatus 20 terminates the normal destage processing.

In step SP832, the edge storage apparatus 20 destages the dirty data corresponding to the cache management entry 231 selected in step SP830 to the core storage apparatus 30.

To be more specific, the edge storage apparatus 20 firstly identifies the virtual logical unit management entry 221 corresponding to the relevant cache management entry 231 on the basis of the stored data identification information 233 in the relevant cache management entry 231. Then, the edge storage apparatus 20 indentifies the logical unit 101 of the virtualization target in the core storage apparatus 30 on the basis of the virtualization target logical unit identification information 224 registered in the identified virtual logical unit management entry 221, and sends a write request (core storage apparatus) to write the relevant dirty data to the identified logical unit 101 of the core storage apparatus 30 (SP832).

After that, the edge storage apparatus 20 receives a response to the relevant write request (core storage apparatus) sent from the core storage apparatus 30 (SP833), and then registers "OFF" in the dirty flag 234 in the relevant cache management entry 231 (SP834).

As above, in the normal destage processing performed regularly, or when there is shortage of free area in the cache memory 25, and the like, the destage is performed on the dirty data as the target having "ON" registered in the destage permission flag 235 in the cache management entry 231.

Figure 14:
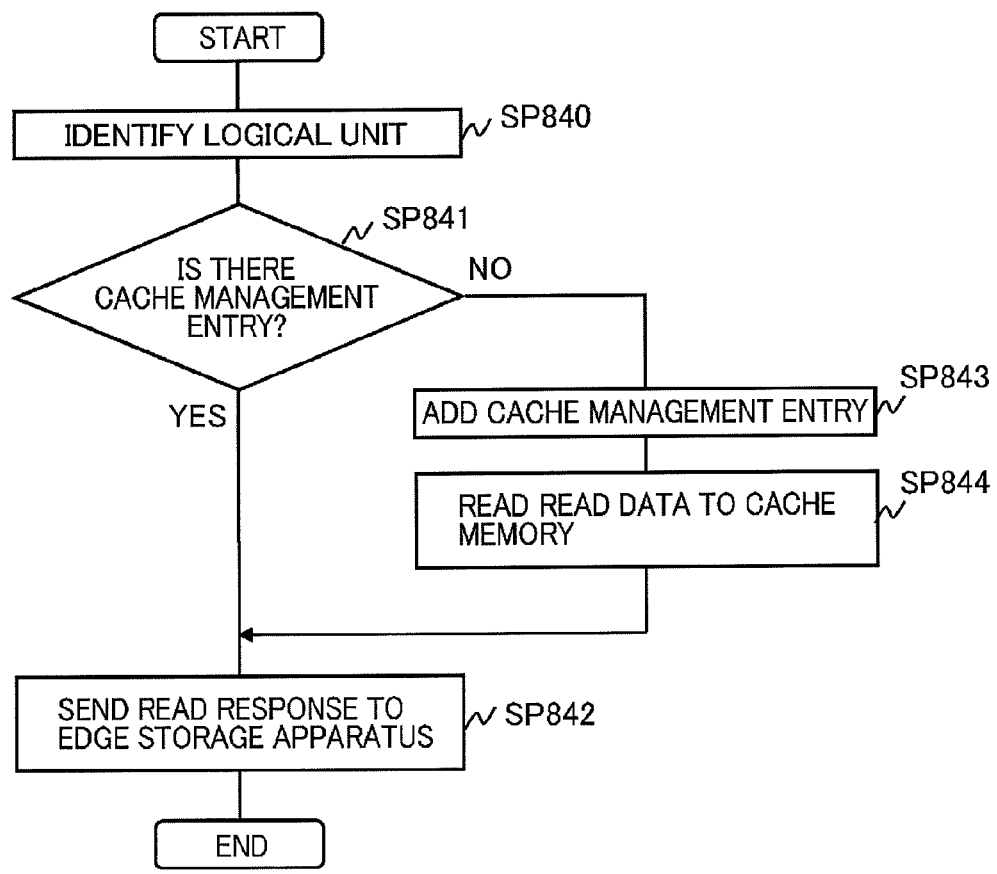
FIG. 14 is a flowchart explaining read processing (core storage apparatus).

FIG. 14 is a flowchart explaining processing that the core storage apparatus 30 performs when receiving a read request (core storage apparatus) from the edge storage apparatus 20 (hereinafter also referred to as read processing (core storage apparatus)). The read processing (core storage apparatus) is implemented by the CPU 32 of the core storage apparatus 30 executing the I/O request processing program 300.

Upon receipt of the read request (core storage apparatus) from the edge storage apparatus 20, the core storage apparatus 30 firstly identifies the logical unit 101 of the read destination (SP840).

To be more specific, the core storage apparatus 30 extracts information for identifying the logical unit 101 from the read request (core storage apparatus), as well as refers to the logical unit management table 330 to identify the logical unit management entry 331 having registered therein the logical unit identification information 333 corresponding to the information for identifying the logical unit 101 extracted from the read request (core storage apparatus). Here, the information for identifying the logical unit 101 includes, for example, the source port address, the destination port address, and the LUN.

Next, with reference to the cache management table 340, the core storage apparatus 30 determines whether or not there is a cache management entry 341 corresponding to read data that is read target data of the read request (core storage apparatus) (SP841).

To be more specific, the core storage apparatus 30 extracts information for identifying the read data from the read request (core storage apparatus), as well as refers to the cache management table 340 to determine whether or not there is a cache management entry 341 having registered therein the stored data identification information 343 corresponding to both the logical unit management number 332 registered in the logical unit management entry 331 identified in step SP840, and the information for identifying the read data extracted from the read request (core storage apparatus). Here, the information for identifying the read data is, for example, the LBA.

In this determination, obtaining a positive result indicating that there is a cache management entry 341 corresponding to the read data (SP841: YES) means that the read data is stored in the cache memory 35. In this case, the core storage apparatus 30 performs the processing in step SP842 and the steps that follow.

On the other hand, in the determination of SP841, obtaining a negative result indicating that there is no cache management entry 341 corresponding to the read data (SP841: NO) means that the read data is not stored in the cache memory 35. In this case, the core storage apparatus 30 adds the cache management entry 341 corresponding to the read data to the cache management table 340 (SP843).

At this time, the core storage apparatus 30 registers the address of a free area in the cache memory 35, into the cache address 342 of the cache management entry 341 to be added. In addition, the core storage apparatus 30 registers the information for identifying the read data extracted from the read request (core storage apparatus), in the stored data identification information 343 of the cache management entry 341 to be added. Moreover, the core storage apparatus 30 registers "OFF" in the dirty flag 344 of the cache management entry 341 to be added.

Then, the core storage apparatus 30 identifies a storage destination in the storage device 39 where the data in the logical unit 101 of the read destination is stored, on the basis of the data storage destination identification information 334 registered in the logical unit management entry 331 identified in step SP840, reads the read data from the identified storage destination and stores the read data thus read into the cache memory 35 (SP844). Thereafter, the core storage apparatus 30 performs processing in step SP842.

In step SP842, the core storage apparatus 30 reads the relevant data from the cache memory 35, and sends the read data to the edge storage apparatus 20 (SP842).

Figure 15:
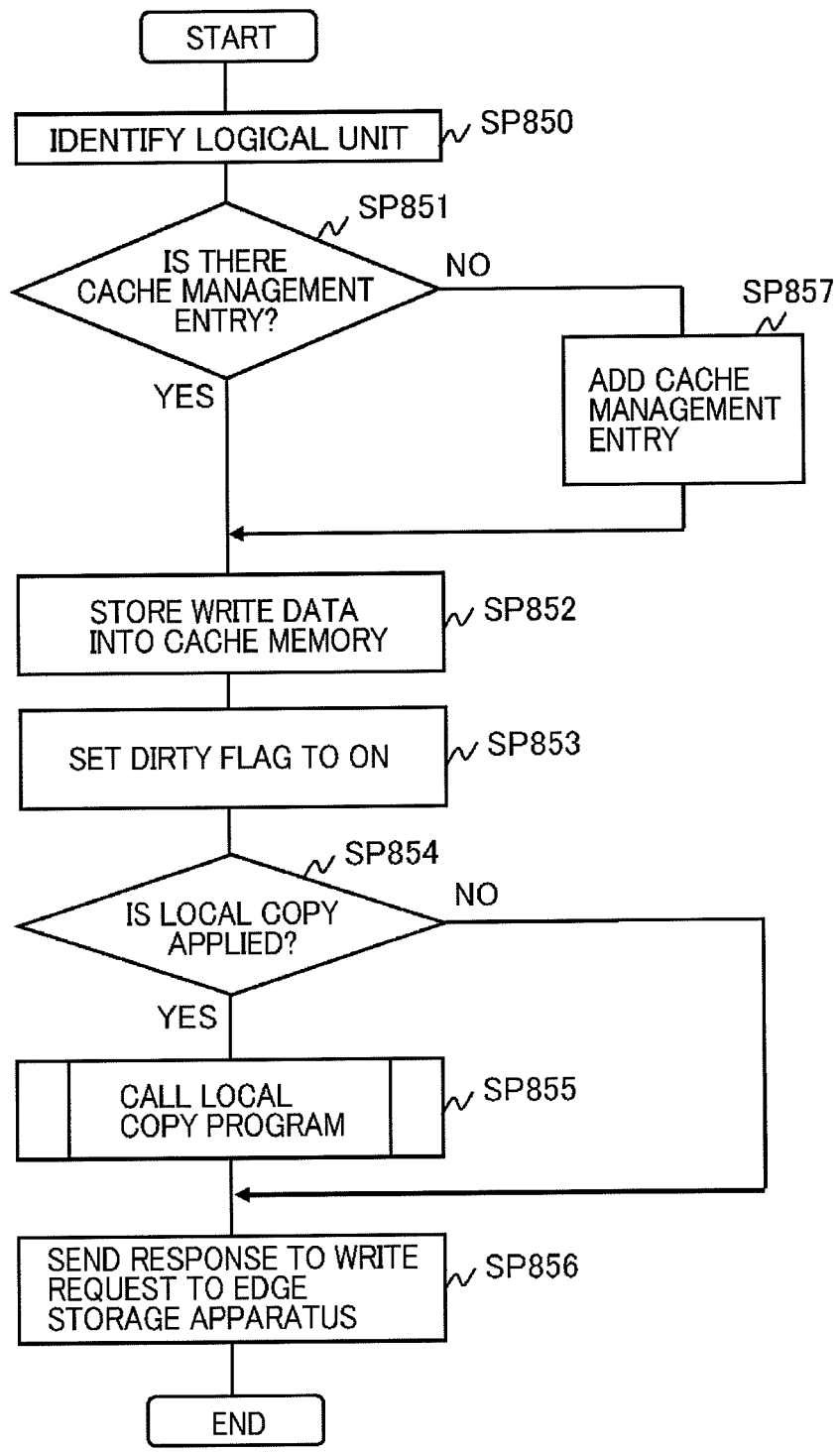
FIG. 15 is a flowchart explaining write processing (core storage apparatus).

FIG. 15 a flowchart explaining processing (hereinafter, also referred to as write processing (core storage apparatus)) that the core storage apparatus 30 performs when receiving a write request (core storage apparatus) from the edge storage apparatus 20 (hereinafter, also referred to as a write processing (core storage apparatus) (second write request)). The write processing (core storage apparatus) is implemented by the CPU 32 of the core storage apparatus 30 executing the I/O request processing program 300.

Upon receipt of a write request (core storage apparatus) from the edge storage apparatus 20, the core storage apparatus 30 firstly identifies the logical unit 101 of a write destination (SP850).

Specifically, the core storage apparatus 30 extracts information for identifying the logical unit 101 from the write request (core storage apparatus), and refers to the logical unit management table 330 to identify the logical unit management entry 331 having registered therein the logical unit identification information 333 corresponding to the information for identifying the logical unit 101 extracted from the write request (core storage apparatus). Here, the information for identifying the logical unit 101 includes, for example, the source port address, the destination port address, and the LUN.

Next, with reference to the cache management table 340, the core storage apparatus 300 determines whether or not there is a cache management entry 341 corresponding to the write data (SP851).

To be more specific, the core storage apparatus 30 extracts information for identifying the write data from the write request (core storage apparatus), and refers to the cache management table 340 to determine whether or not there is a cache management entry 341 having registered therein the stored data identification information 343 corresponding to both the logical unit management number 332 registered in the logical unit management entry 331 identified in step SP850, and the information for identifying the write data extracted from the write request (core storage apparatus). Here, the information for indentifying the write data is, for example, the LBA.

When obtaining a positive result indicating that there is a cache management entry 341 corresponding to the write data in this determination (SP851: YES), the core storage apparatus 30 performs processing in step SP852 and the steps that follow.

On the other hand, when obtaining a negative result indicating that there is no cache management entry 341 corresponding to the write data (SP851: NO), the core storage apparatus 30 adds the cache management entry 341 corresponding to the write data to the cache management table 340 (SP857). At this time, the core storage apparatus 30 registers the address of a free area in the cache memory 35 as the cache address 342 of the cache management entry 341 and registers, as the stored data identification information 343 in the cache management entry 341, information for identifying the write data extracted from the write request (core storage apparatus).

In step SP852, the core storage apparatus 30 stores the write data received from the edge storage apparatus 20 into the cache memory 35 (SP852). Then, the core storage apparatus 30 registers "ON" in the dirty flag 344 in the cache management entry 341 corresponding to the write data (SP853). Note that the data having "ON" registered in the dirty flag 344 is destaged to the storage device 39 at a timing independent of the write request (core storage apparatus).

Subsequently, with reference to the copy pair management table 350, the core storage apparatus 30 determines whether or not the local copy function is applied to the logical unit 101 of the write destination (SP854).

To be more specific, the core storage apparatus 30 determines whether or not there is a copy pair management entry 351 in which the logical unit management number 332, registered in the logical unit management entry 331 identified in step SP850, is registered as the primary volume number 352 or the secondary volume number 353.

When obtaining a positive result indicating that the local copy function is applied to the logical unit 101 of the write destination in this determination (SP854: YES), the core storage apparatus 30 performs processing relating to local copy (hereinafter referred to as local copy processing) (SP855). The local copy processing will be described in detail later. After the execution of the local copy processing, the core storage apparatus 30 performs processing in step SP856.

On the other hand, when obtaining a negative result indicating that the local copy function is not applied to the logical unit 101 of the write destination in the determination in step SP854 (SP854: NO), the core storage apparatus 30 performs the processing in step SP856.

In step SP856, the core storage apparatus 30 sends the edge storage apparatus 20 a response indicating the completion of the write processing (SP856).

In this way, when receiving a write request (core storage apparatus) from the edge storage apparatus 20, the core storage apparatus 30 stores the write data into the cache memory 35 (SP852) in order to write the write data to the storage device 39. In addition, when the local copy function is applied to the logical unit 101 of the write destination, the core storage apparatus 30 performs the local copy processing (SP855).

Figure 16:
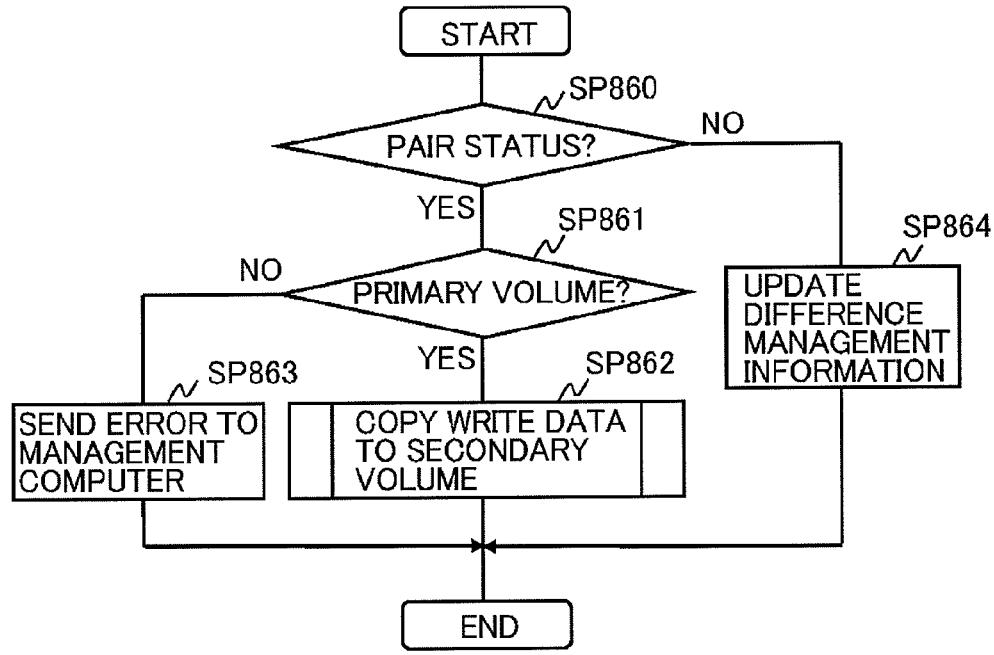
FIG. 16 is a flowchart explaining local copy processing.

FIG. 16 is a flowchart explaining details of the local copy processing executed by the core storage apparatus 30 in step SP855 in FIG. 15. The local copy processing is implemented by the CPU 32 of the core storage apparatus 30 executing the local copy program 320.

The core storage apparatus 30 firstly determines whether or not the copy pair having the logical unit 101 of the write destination as the primary volume is in a PAIR status (SP860).

To be more specific, with reference to the copy pair management table 350, the core storage apparatus 30 determines whether or not the pair status 354, of the copy pair management entry 350 determined that the local copy function is applied, in step SP854 is currently a "PAIR".

When obtaining a positive result indicating that the copy pair is currently in the PAIR status (SP860: YES) in this determination, then the core storage apparatus 30 subsequently determines whether or not the logical unit 101 of the write destination identified in step SP850 is the primary volume of the copy pair (SP861).

Specifically, the core storage apparatus 30 determines whether or not the logical unit management number 332 in the logical unit management entry 331 corresponding to the logical unit 101 of the write destination is registered in the primary volume number 352 in the relevant copy pair management entry 351. When obtaining a positive result indicating that the logical unit 101 of the write destination identified in step SP850 is the primary volume of the copy pair in the determination in step SP861 (SP861: YES), the core storage apparatus 30 also duplicates the write data to the secondary volume (SP862). Note that, when the duplication of the write data to the secondary volume is performed in synchronization with, for example, the write request (core storage apparatus), the core storage apparatus 30 executes update copy processing shown in FIG. 17.

In contrast, when the duplication is performed in an asynchronous manner with the write request (core storage apparatus), the core storage apparatus 30 registers in the difference information 355 of the relevant copy pair management entry 351 by recording that there is a difference between the primary volume and the secondary volume in terms of the storage area corresponding to the write request (core storage apparatus). Then, the core storage apparatus 30 duplicates data in the area having the difference, which is identified by using the difference information 355, from the primary volume to the secondary volume at a timing independent of the write request (core storage apparatus).

On the other hand, when obtaining a negative result indicating that the logical unit 101 of the write destination identified in step SP850 is not the primary volume of the copy pair in the determination in step SP861 (SP861: NO), the core storage apparatus 30 sends the management computer 40 an error indicating that the write request has been sent to the secondary volume in the PAIR status (SP863).

Here, when obtaining a negative result indicating that the copy pair is not in the PAIR status in the determination in step SP860 (SP860: NO), the core storage apparatus 30 registers the difference information 355 of the relevant copy pair management entry 351 by recording that there is a difference between the primary volume and the secondary volume in terms of the storage area corresponding to the write request (core storage apparatus). Then, at a timing when the pair status 354 is changed from "PSUS" to "PAIR", the core storage apparatus 30 refers to the difference information 355 and duplicates data in the area having the difference from the primary volume to the secondary volume.

Figure 17:
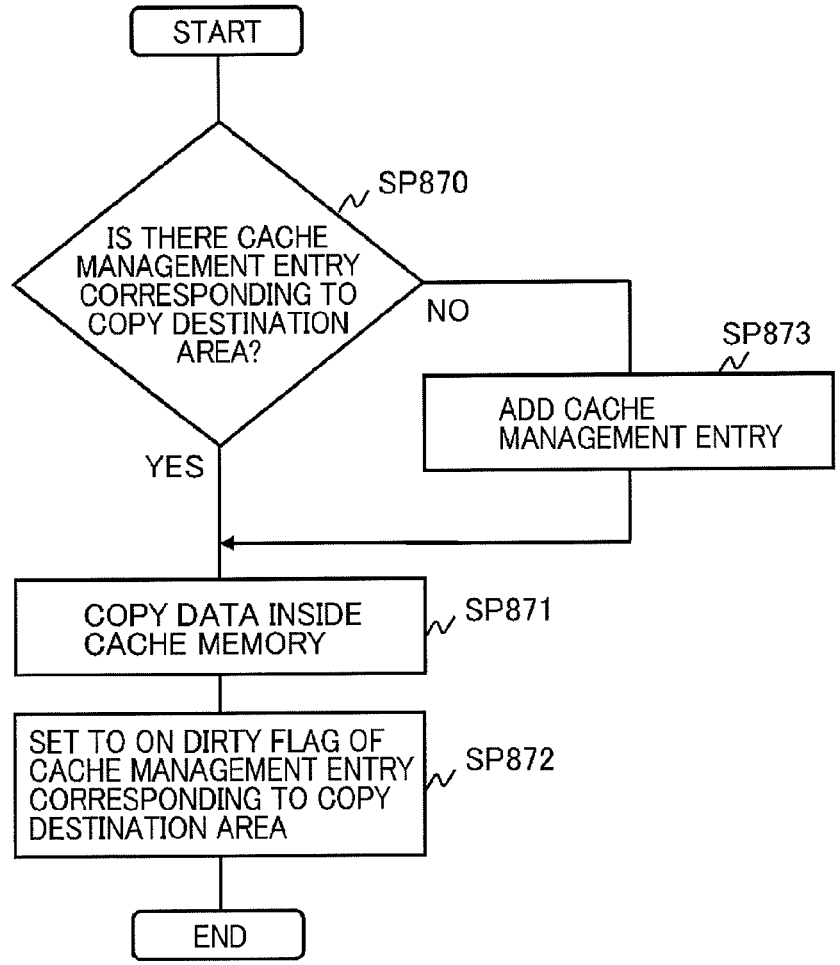
FIG. 17 is a flowchart explaining update copy processing.

FIG. 17 is a flowchart explaining processing that the core storage apparatus 30 executes when duplicating the write data to the secondary volume in synchronization with the write request in step SP862 in FIG. 16 (hereinafter also referred to as update copy processing).

The core storage apparatus 30 firstly determines whether or not there is a cache management entry 351 corresponding to the copy destination area (SP870).

To be more specific, with reference to the cache management table 340, the core storage apparatus 30 determines whether or not there is a cache management entry 341 in which the information for identifying the storage area of the secondary volume corresponding to the storage area of the write destination is registered as the stored data identification information 343.

When obtaining a positive result indicating that there is a cache management entry 341 corresponding to the copy destination area in this determination (SP870: YES), the core storage apparatus 30 performs processing in step SP871 and the steps that follow.

On the other hand, when obtaining a negative result indicating that there is no cache management entry 341 corresponding to the copy destination area in the determination in step SP870 (SP870: NO), the core storage apparatus 30 adds the cache management entry 341 corresponding to the relevant data to the cache management table 340 (SP873). At this time, the core storage apparatus 30 registers the address of a free area in the cache memory 35 to the cache address 342 in the added cache management entry 341 to be added. In addition, the core storage apparatus 30 registers the information for identifying the storage area of the secondary volume corresponding to the storage area of the write destination, to the stored data identification information 343 in the cache management entry 341. Moreover, the core storage apparatus 30 registers "ON" in the dirty flag 344 in the cache management entry 341. Thereafter, the core storage apparatus 30 performs the processing in step SP871 and the steps that follow.

In step SP871, the core storage apparatus 30 duplicates the relevant data from the area for the primary volume to the area for the secondary volume inside the cache memory 35 (SP871).

Specifically, in the cache memory 35, the core storage apparatus 30 duplicates data stored in the area of the cache address 342 in the relevant cache management entry 341 for the primary volume to the area of the cache address 342 in relevant the cache management entry 341 for the secondary volume.

Next, the core storage apparatus 30 registers "ON" in the dirty flag 344 in the cache management entry 341 (SP872).

Figure 18:
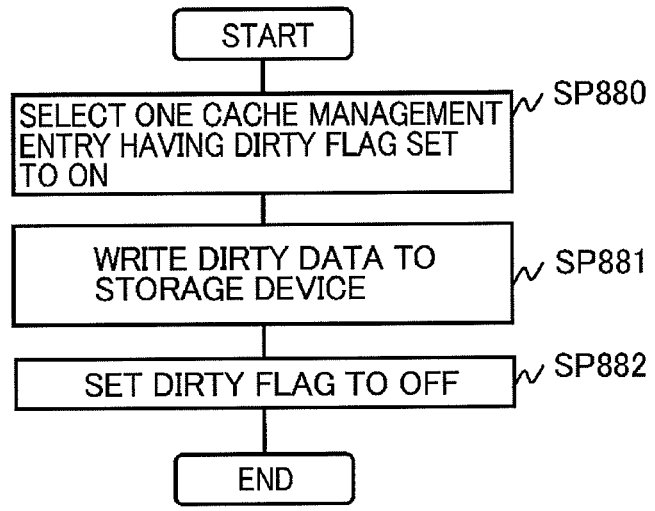
FIG. 18 is a flowchart explaining dirty data destage processing.

FIG. 18 is a flowchart explaining processing that the core storage apparatus 30 performs regularly or when there is shortage of free area in the cache memory 35 (hereinafter also referred to as dirty data destage processing). This processing is performed at a designated timing or at a specified cycle, or such as when there is shortage of free area in the cache memory 25 reaching a predetermined threshold. The dirty data destage processing is implemented by the CPU 32 of the core storage apparatus 30 executing the dirty data destage program 310. Hereinafter, the dirty data destage processing will be described with reference to FIG. 18.

The core storage apparatus 30 firstly selects one cache management entry 341 having "ON" registered in the dirty flag 344 with reference to the cache management table 340 (SP880).

Then, the core storage apparatus 30 destages the dirty data corresponding to the cache management entry 341 selected in step SP880 to the storage device 39 (SP881).

To be more specific, the core storage apparatus 30 firstly identifies the logical unit management entry 331 corresponding to the relevant cache management entry 341 on the basis of the stored data identification information 343 in the relevant cache management entry 341. Then, the core storage apparatus 30 identifies the storage area where the relevant data is stored in the storage device 39, on the basis of the data storage destination identification information 334 registered in the identified logical unit management entry 331.

After that, the core storage apparatus 30 writes the data stored in the cache memory 35 specified by the cache address 342 in the cache management entry 341 to the identified storage area (SP881). And, the core storage apparatus 30 registers "OFF" in the dirty flag 344 in the relevant cache management entry 341 (SP882).

Figure 19:
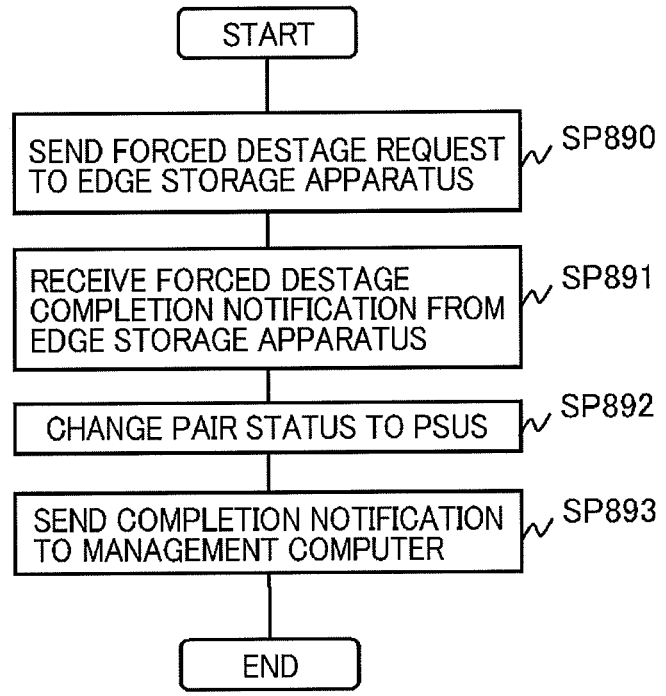
FIG. 19 is a flowchart explaining pair split processing.

FIG. 19 is a flowchart explaining processing that the core storage apparatus 30 performs when receiving an instruction to perform pair splitting (hereinafter also referred to as a pair split instruction) from the management computer 40 (hereinafter also referred to as pair split processing). The pair split processing is implemented by the CPU 32 of the core storage apparatus 30 executing the local copy program 320.

The core storage apparatus 30 firstly sends the edge storage apparatus 20 an instruction requesting (hereinafter also referred to as a forced destage request) to forcedly destage data stored in the cache memory 25 (hereinafter also referred to as forced destage) (SP890).

To be more specific, the core storage apparatus 30 extracts the number for indentifying the primary volume from the pair split instruction received from the management computer 40, and refers to the logical unit management table 330 to identify the logical unit management entry 331 in which the number for identifying the primary volume extracted from the pair split instruction is registered as the logical unit management number 332. Then, the core storage apparatus 30 sends the edge storage apparatus 20 the forced destage request in which the logical unit identification information 333 registered in the identified logical unit management entry 331 is registered as the information for identifying the logical unit 101 of a forced destage destination to which the data is forcedly destaged.

As will be described later, upon receipt of the forced destage request, the edge storage apparatus 20 destages the dirty data in the virtual logical unit 102 created by virtualizing the logical unit 101 of the forced destage destination, from the cache memory 25 to the core storage apparatus 30. In this way, the data consistency in the relevant primary volume is ensured.

After completion of the destage of the dirty data, the edge storage apparatus 20 sends the core storage apparatus 30 a forced destage completion notification. Upon receipt of the forced destage completion notification (SP891), the core storage apparatus 30 performs pair splitting.

More specifically, the core storage apparatus 30 firstly extracts the numbers for identifying the primary volume and the secondary volume from the pair split instruction received in step SP890, as well as refers to the copy pair management table 350 to identify the copy pair management entry 351 in which the number for identifying the primary volume extracted from the pair split instruction is registered as the primary volume number 352 and in which the number for identifying the secondary volume extracted from the pair split instruction is registered as the secondary volume number 353.

Here, if the write data is replicated to the secondary volume in synchronization with the write request in the processing in step SP862, the core storage apparatus 30 registers "PSUS" in the pair status 354 in the identified copy pair management entry 351.

On the other hand, if the write data is replicated to the secondary volume in an asynchronous manner with the write request in the processing in step SP862, the core storage apparatus 30 copies the data in the area having the difference from the primary volume to the secondary volume with reference to the difference information 355 in the identified copy pair management entry 351, and thereafter registers "PSUS" in the pair status 354 in the relevant copy pair management entry 351 as pair status 354.

In step SP893, the core storage apparatus 30 sends the management computer 40 a pair split completion notification.

Figure 20:
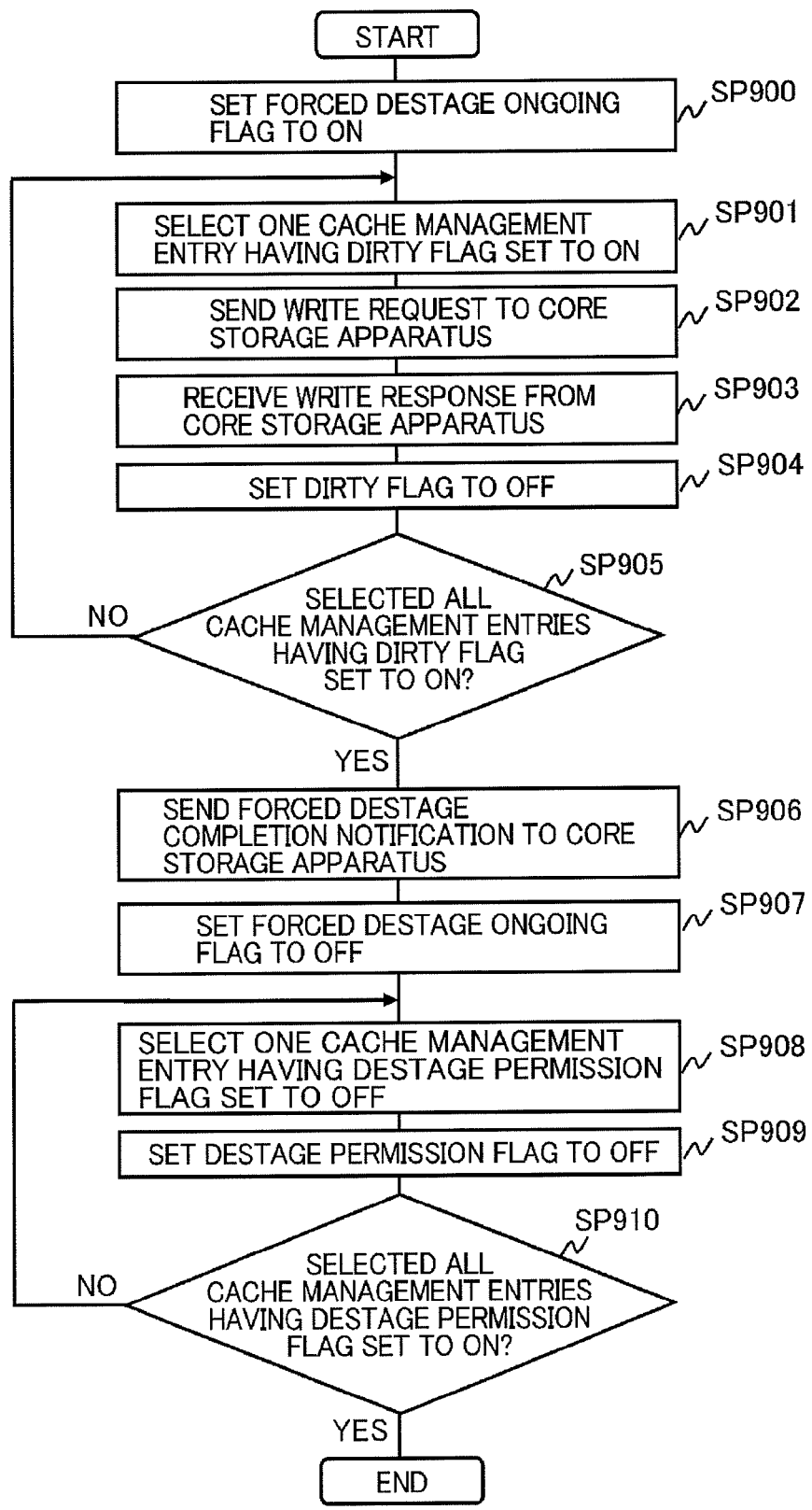
FIG. 20 is a flowchart explaining forced destage processing.

FIG. 20 is a flowchart explaining processing that the edge storage apparatus 20 performs when receiving the forced destage request from the core storage apparatus 30 (hereinafter also referred to as forced destage processing). The forced destage processing is implemented by the CPU 22 of the edge storage apparatus 20 executing the dirty data destage program 210. Hereinafter, the forced destage processing will be described with reference to FIG. 20.

The edge storage apparatus 20 firstly identifies the virtual logical unit 102 targeted by the forced destage request, as well as registers "ON" in the forced destage ongoing flag 225 in the virtual logical unit management entry 221 corresponding to the identified virtual logical unit 102 (SP900).

More specifically, the edge storage apparatus 20 firstly extracts information for identifying the logical unit 101 of the destage destination for the forced destage request, as well as refers to the virtual logical unit management table 220 to identify the virtual logical unit management entry 221 (i.e., identify the virtual logical unit 102) in which the extracted information for identifying the logical unit 101 of the destage destination is registered as the virtualization target logical unit identification information 224. Then, the edge storage apparatus 20 registers "ON" in the forced destage ongoing flag 225 in the identified virtual logical unit management entry 221.

Next, the edge storage apparatus 20 selects one cache management entry 231 corresponding to data in the virtual logical unit 102 identified in step SP900 and having "ON" in the dirty flag 24, with reference to the cache management table 230

(SP901), and destages the dirty data corresponding to the selected cache management entry 231 to the core storage apparatus 30 (SP902).

To be more specific, the edge storage apparatus 20 identifies the virtual logical unit management entry 221 corresponding to the relevant cache management entry 231 on the basis of the stored data identification information 233 in the relevant cache management entry 231. After that, the edge storage apparatus 20 identifies the logical unit 101 of the core storage apparatus 30 corresponding to the virtualization target logical unit identification information 224 registered in the identified virtual logical unit management entry 221, and sends a write request including the relevant dirty data to the identified logical unit 101. Thereafter, the edge storage apparatus 20 receives a response to the relevant write request from the core storage apparatus 30 (SP903), and then registers "OFF" in the dirty flag 234 in the relevant cache management entry 231 (SP904).

In step SP905, the edge storage apparatus 20 determines whether or not all the cache management entries 231 corresponding to the data in the virtual logical unit 102 of the destage target identified in step SP900 and having "ON" in the dirty flag 234 have been selected (SP905).

When obtaining a negative result indicating that all the cache management entries 231 corresponding to the data in the virtual logical unit 102 of the destage target identified in step SP900 and having "ON" in the dirty flag 234 are not yet selected in the determination in step SP905 (SP905: NO), the edge storage apparatus 20 repeats the processing from step SP901 targeting the cache management entry 231 that has not been selected.

In contrast, when obtaining a positive result indicating that all the cache management entries 231 corresponding to the data in the virtual logical unit 102 of the destage target identified in step SP900 and having "ON" in the dirty flag 234 have been selected in the determination in step SP905 (SP905: YES), the edge storage apparatus 20 sends a forced destage completion notification to the local copy program 320 of the core storage apparatus 30 (SP906).

In step SP907, the edge storage apparatus 20 registers "OFF" in the forced destage ongoing flag 225 in the virtual logical unit management entry 221 identified in step SP900 (SP907).

Next, the edge storage apparatus 20 selects one of the cache management entries 231 corresponding to the data in the relevant virtual logical unit 102 and having "OFF" in the destage permission flag 235 with reference to the cache management table 230 (SP908), and registers "ON" in the destage permission flag 235 in the selected cache management entry 231 (SP909). This registration of "ON" in the destage permission flag 235 in the selected cache management entry 231 prevents the data from remaining unnecessarily in the cache memory 25 and leads to effective use of the cache memory 25.

Next, the edge storage apparatus 20 determines whether or not all the cache management entries 231 corresponding to the data in the relevant virtual logical unit 102 and having "OFF" in the destage permission flag 235 have been selected (SP910).

When obtaining a negative result indicating that all the cache management entries 231 corresponding to the data in the virtual logical unit 102 and having "OFF" in the destage permission flag 235 have not been selected yet in this determination (SP910: NO), the edge storage apparatus 20 repeats the processing from step SP908 targeting each of the cache management entries 231 not having been selected yet.

On the other hand, when the edge storage apparatus 20 obtains a positive result indicating that all the cache management entries 231 corresponding to the data in the relevant virtual logical unit 102 and having "OFF" in the destage permission flag 235 have been selected in the determination in step SP910 (SP910: YES), the forced destage processing is terminated.

As described above, upon receipt of the forced destage request from the core storage apparatus 30, the edge storage apparatus 20 destages dirty data corresponding to the cache management entries each having "ON" in the dirty flag 234 (SP902). Thus, the consistency of the data stored in the storage device 39 is secured, which in turn enables execution of the storage function control processing, which is processing that can be executed for the storage function on the condition that the data consistency is secured.

Although an embodiment of the present invention has been described hereinabove, the above embodiment is intended to facilitate the understanding of the present invention, and is not intended to limit the present invention in its interpretation. The present invention can be changed and modified without deviating from the scope of the invention, and also includes equivalents thereof.

For instance, the foregoing description was provided for the case where the core storage apparatus 30 had the local copy function as the storage function, and the pair split processing was presented as the processing (storage function control processing) that is executed on the condition that the data consistency is secured. The storage function and the storage function control processing, however, are not limited to the above.

In one example, the present invention is also applicable to a case where the core storage apparatus 30 has a remote copy function (a function to provide the same function as the local copy function to a primary volume and a secondary volume located at remote sites) as the storage function, and where the core storage apparatus 30 performs pair split processing in the remote copy function upon receipt of an instruction from the management computer 40 or the like, as the processing (storage function control processing) that can be executed on the condition that the data consistency is secured. In this case, pair split processing can be performed in the remote copy function while providing high write performance to the host computer 10.

In another example, the present invention is also applicable to a case where the core storage apparatus 30 has a snapshot function as the storage function, and where the core storage apparatus 30 captures a snapshot image of a certain logical unit 101 in response to a snapshot capture instruction from the management computer 40 or the like, as the processing (storage function control processing) executed on the condition that the data consistency is secured. In this case, snapshot capture processing in the snapshot function can be performed while providing high write performance to the host computer 10.

The logical units 101 provided by the core storage apparatus 30 to the edge storage apparatus 20 may be storage areas provided by thin provisioning. In this case, the storage area of the RAID group 100 is used as a resource for the storage pool, for example.

The invention claimed is:

1. A storage system comprising:
a first storage apparatus communicatively coupled to an external apparatus and including a cache memory; and
a second storage apparatus communicatively coupled to the first storage apparatus and performs I/O processing on a storage device, wherein
the first storage apparatus, when receiving a first write request that is a write request sent from the external apparatus, stores write data for the received first write request to the cache memory, returns a response to the external apparatus upon completion of the storing, and destages the write data at a timing asynchronous with the response by sending the second storage apparatus a second write request that is a write request for the write data, the second storage apparatus stores the write data into the storage device upon receipt of the second write request from the first storage apparatus, the second storage apparatus sends the first storage apparatus a forced destage request that is a request instructing the destage of the write data stored in the cache memory, before executing a predetermined storage function control processing, the first storage apparatus, when receiving the forced destage request, performs forced destage of destaging the write data from the cache memory in response to the request, and, upon completion of the forced destage, sends a notification of the completion to the second storage apparatus, and the second storage apparatus executes the storage function control processing after receiving the notification from the first storage apparatus.

2. The storage system according to claim 1, wherein the first storage apparatus manages a destage permission flag that is information indicating whether destage of the write data stored in the cache memory is permitted or not, determines whether or not the forced destage is currently in execution, when storing the write data to the cache memory, sets the destage permission flag of the write data to "not-permitted" if the forced destage is in execution, whereas setting the destage permission flag of the write data to "permitted" if the forced destage is not in execution, and performs the destage of the write data having the destage permission flag set to "permitted".

3. The storage system according to claim 2, wherein the first storage apparatus, when about to store the write data for the first write request to the cache memory, determines whether or not a current state satisfies both conditions that the forced destage is currently in execution and that "permitted" is set in the destage permission flag of dirty data stored in an area, of a storage destination where the write data is to be stored, in the cache memory, when the conditions are not satisfied, stores the write data to the cache memory, and when the conditions are satisfied, sends the second write request for the dirty data stored in the area of the storage destination to the second storage apparatus, and thereafter stores the write data to the cache memory.

4. The storage system according to claim 2, wherein the first storage apparatus sets "permitted" in the destage permission flag of the write data after performing the forced destage of the write data in response to the forced destage request.

5. The storage system according to claim 1, wherein the first storage apparatus when storing the write data to the cache memory in response to the first write request received from the external apparatus, sets a dirty flag of the write data to indicate that the destage is needed, the dirty flag being information indicating whether or not the write data needs to be destaged, sets the dirty flag of the write data to indicate that the destage is not needed, when destaging the write data stored in the cache memory, and sets the dirty flag of the write data to indicate that the destage is not needed, when destaging the write data from the cache memory in response to the forced destage request received from the second storage apparatus.

6. The storage system according to claim 1, wherein the second storage apparatus performs the I/O processing on the storage device by targeting logical units that are logical storage areas formed of a storage area of the storage device, the storage function is a local copy function that is a function to manage a replication of a first one of the logical units in a second one of the logical units, by storing the write data for the second write request into also the second logical unit when storing the write data for the second write request into the first logical unit, the local copy function includes at least a function to switch a control status between either a first control status in which the write data is replicated to the second logical unit when the write data is stored into the first logical unit, or a second control status in which a difference between a content in the first logical unit and a content in the second logical unit is managed as difference information and the difference generated by storing the write data into the first logical unit is managed as the difference information, and the storage function control processing is processing to switch the control status of the local copy function from the first control status to the second control status.

7. The storage system according to claim 6, wherein the case where consistency of data stored in the storage device is secured is a case where an actual content in the first logical unit is consistent with a content in the first logical unit that the external apparatus recognizes from the response to the first write request received from the first storage apparatus.

8. The storage system according to claim 6, wherein the second storage apparatus, when switching from the second control status to the first control status, identifies data having a difference on the basis of the difference information, replicates the identified data from the first logical unit to the second logical unit, and thereby makes the content in the first logical unit and the content of the second logical unit consistent with each other.

9. The storage system according to claim 1, wherein the second storage apparatus performs the I/O processing on the storage device by targeting a logical unit that is a logical storage area formed of a storage area of the storage device, the storage function is a remote copy function that is a function to manage a replication of the first logical unit in a third logical unit in a third storage apparatus by transferring and storing the write data for the second write request to the third logical unit when storing the write data for the second write request into the first logical unit, and the remote copy function includes at least a function to switch a control status between either a first control status in which the write data is replicated to the third logical unit when the write data is stored into the first logical unit, or a second control status in which a difference between a content in the first logical unit and a content in the third logical unit is managed as difference information and the difference generated by storing the write data into the first logical unit is managed as the difference information, and the storage function control processing is processing to switch the control status of the remote copy function from the first control status to the second control status.

10. The storage system according to claim 1, wherein the second storage apparatus performs the I/O processing on the storage device by targeting a logical unit that is a logical storage area formed of a storage area of the storage device, the storage function is a snapshot function being a function to capture a snapshot that represents a status of the logical unit at a certain time section, and the storage function control processing is processing to capture the snapshot.

11. The storage system according to claim 1, wherein the second storage apparatus performs the I/O processing on the storage device by targeting a logical unit that is a logical storage area formed of a storage area of the storage device, and the first storage apparatus provides the external apparatus with a storage area in a unit of virtual logical unit that is a virtual storage area formed of the storage area of the logical unit.

12. The first storage apparatus in the storage system according to claim 1, wherein the storage apparatus, when receiving a first write request that is a write request sent from the external apparatus, stores write data for the received first write request to the cache memory, returns a response to the external apparatus upon completion of the storing, and destages the write data at a timing asynchronous with the response by sending the second storage apparatus a second write request that is a write request for the write data, and the storage apparatus, when receiving the forced destage request, performs forced destage of destaging the write data from the cache memory in response to the request, and, upon completion of the forced destage, sends a notification of the completion to the second storage apparatus.

13. A second storage apparatus in a storage system including a first storage apparatus communicatively coupled to an external apparatus and including a cache memory; and the second storage apparatus communicatively coupled to the first storage apparatus and performs I/O processing on a storage device, and the second storage apparatus executes storage function control processing that is processing for a storage function provided by the second storage apparatus in regard to data stored in the storage device, and executed on the condition that consistency of the data stored in the storage device is secured, the first storage apparatus, when receiving a first write request that is a write request sent from the external apparatus, stores write data for the received first write request to the cache memory, returns a response to the external apparatus upon completion of the storing, and destages the write data at a timing asynchronous with the response by sending the second storage apparatus a second write request that is a write request for the write data, the second storage apparatus stores the write data into the storage device upon receipt of the second write request from the first storage apparatus, the second storage apparatus sends the first storage apparatus a forced destage request that is a request instructing the destage of the write data stored in the cache memory, when about to execute the storage function control processing, the first storage apparatus, when receiving the forced destage request, performs forced destage of destaging the write data from the cache memory in response to the request, and, upon completion of the forced destage, sends a notification of the completion to the second storage apparatus, and the second storage apparatus executes the storage function control processing after receiving the notification from the first storage apparatus, wherein the second storage apparatus in the storage system executes storage function control processing that is processing for a storage function provided by the second storage apparatus in regard to data stored in the storage device, and executed on the condition that consistency of the data stored in the storage device is secured, stores the write data into the storage device upon receipt of the second write request from the first storage apparatus, and sends the first storage apparatus a forced destage request that is a request instructing the destage of the write data stored in the cache memory, when about to execute the storage function control processing, and performs the storage function control processing after receiving the notification from the first storage apparatus.

14. A method of controlling a storage system including a first storage apparatus communicatively coupled to an external apparatus and including a cache memory, and a second storage apparatus communicatively coupled to the first storage apparatus and performs I/O processing on a storage device, the method comprising:

executing by the second storage apparatus, storage function control processing that is processing for a storage function provided by the second storage apparatus in regard to data stored in the storage device, executed on the condition that consistency of the data stored in the storage device is secured;

storing by the first storage apparatus, when receiving a first write request that is a write request sent from the external apparatus, write data for the received first write request to the cache memory, returning a response to the external apparatus upon completion of the storing, and performing destage at a timing asynchronous with the response by sending the second storage apparatus a second write request that is a write request for the write data;

storing by the second storage apparatus the write data into the storage device upon receipt of the second write request from the first storage apparatus;

sending by the second storage apparatus the first storage apparatus a forced destage request that is a request instructing the destage of the write data stored in the cache memory, when about to execute the storage function control processing;

performing by the first storage apparatus, when receiving the forced destage request, forced destage of destaging the write data from the cache memory in response to the request, and, upon completion of the forced destage, sending a notification of the completion to the second storage apparatus; and executing by the second storage apparatus, the storage function control processing after receiving the notification from the first storage apparatus.

15. The method of controlling a storage system according to claim 14, wherein the first storage apparatus manages a destage permission flag that is information indicating whether destage of the write data stored in the cache memory is permitted or not, determines whether or not the forced destage is currently in execution, when storing the write data to the cache memory, sets the destage permission flag of the write data to "not-permitted" if the forced destage is in execution, whereas setting the destage permission flag of the write data to "permitted" if the forced destage is not in execution, and performs the destage of the write data having the destage permission flag set to "permitted".

16. The method of controlling a storage system according to claim 15, wherein the first storage apparatus when about to store the write data for the first write request to the cache memory, determines whether or not a current state satisfies both conditions that the forced destage is currently in execution and that "permitted" is set in the destage permission flag of dirty data stored in an area, of a storage destination where the write data is to be stored, in the cache memory, stores the write data to the cache memory when the conditions are not satisfied, and sends the second write request for the dirty data stored in the area of the storage destination to the second storage apparatus, and thereafter stores the write data to the cache memory when the conditions are satisfied.

17. The method of controlling a storage system according to claim 14, wherein the first storage apparatus sets "permitted" in the destage permission flag of the write data after performing the forced destage of the write data in response to the forced destage request.

18. The method of controlling a storage system according to claim 14, wherein the first storage apparatus sets a dirty flag of the write data to indicate that the destage is needed, when storing the write data to the cache memory in response to the first write request received from the external apparatus, the dirty flag being information indicating whether or not the write data needs to be destaged, sets the dirty flag of the write data to indicate that the destage is not needed, when destaging the write data stored in the cache memory, and sets the dirty flag of the write data to indicate that the destage is not needed, when destaging the write data from the cache memory in response to the forced destage request received from the second storage apparatus.

19. The method of controlling a storage system according to claim 14, wherein the second storage apparatus performs the I/O processing on the storage device by targeting logical units that are logical storage areas formed of a storage area of the storage device, the storage function is a local copy function that is a function to manage a replication of a first one of the logical units in a second one of the logical units, by storing the write data for the second write request into also the second logical unit when storing the write data for the second write request into the first logical unit, the local copy function includes at least a function to switch a control status between either a first control status in which the write data is replicated to the second logical unit when the write data is stored into the first logical unit, or a second control status in which a difference between a content in the first logical unit and a content in the second logical unit is managed as difference information and the difference generated by storing the write data into the first logical unit is managed as the difference information, and the storage function control processing is processing to switch the control status of the local copy function from the first control status to the second control status.

20. The method of controlling a storage system according to claim 19, wherein the case where consistency of data stored in the storage device is secured is a case where an actual content in the first logical unit is consistent with a content in the first logical unit that the external apparatus recognizes from the response to the first write request received from the first storage apparatus.

* * * * *